(12) United States Patent
Chen et al.

(10) Patent No.: US 12,450,495 B2
(45) Date of Patent: Oct. 21, 2025

(54) NEURAL CAPACITANCE: NEURAL NETWORK SELECTION VIA EDGE DYNAMICS

(71) Applicants: International Business Machines Corporation, Armonk, NY (US); RENSSELAER POLYTECHNIC INSTITUTE, Troy, NY (US)

(72) Inventors: Pin-Yu Chen, White Plains, NY (US); Tejaswini Pedapati, White Plains, NY (US); Bo Wu, Cambridge, MA (US); Chuang Gan, Cambridge, MA (US); Chunheng Jiang, Troy, NY (US); Jianxi Gao, Niskayuna, NY (US)

(73) Assignees: International Business Machines Corporation, Armonk, NY (US); Rensselaer Polytechnic Institute, Troy, NY (US)

( * ) Notice: Subject to any disclaimer, the term of this patent is extended or adjusted under 35 U.S.C. 154(b) by 748 days.

(21) Appl. No.: 17/838,722

(22) Filed: Jun. 13, 2022

(65) Prior Publication Data

US 2023/0401435 A1    Dec. 14, 2023

(51) Int. Cl.
*G06N 3/096* (2023.01)
*G06N 3/08* (2023.01)
(52) U.S. Cl.
CPC ............. *G06N 3/096* (2023.01); *G06N 3/08* (2013.01)
(58) Field of Classification Search
CPC ........... G06N 3/08; G06N 3/082; G06N 3/096
See application file for complete search history.

(56) References Cited

U.S. PATENT DOCUMENTS

2020/0210840 A1    7/2020  Darvish Rouhani
2021/0034809 A1    2/2021  Potash
(Continued)

FOREIGN PATENT DOCUMENTS

CN    108875833 A    11/2018
CN    112771545 A    5/2021
(Continued)

OTHER PUBLICATIONS

Renggli, Cedric, et al. "Which Model to Transfer? Finding the Needle in the Growing Haystack." arXiv preprint arXiv:2010.06402 (2020). (Year: 2020).*

(Continued)

*Primary Examiner* — Benjamin P Geib
(74) *Attorney, Agent, or Firm* — Caleb Wilkes; Otterstedt & Kammer PLLC

(57) ABSTRACT

An output layer is removed from a pre-trained neural network model and a neural capacitance probe unit with multiple layers is incorporated on top of one or more bottom layers of the pre-trained neural network model. The neural capacitance probe unit is randomly initialized and a modified neural network model is trained by fine-tuning the one or more bottom layers on a target dataset for a maximum number of epochs, the modified neural network model comprising the neural capacitance probe unit incorporated with multiple layers on top of the one or more bottom layers of the pre-trained neural network model. An adjacency matrix is obtained from the initialized neural capacitance probe unit and a neural capacitance metric is computed using the adjacency matrix. An active model is selected using the neural capacitance metric and a machine learning system is configured using the active model.

20 Claims, 14 Drawing Sheets

(56) References Cited

U.S. PATENT DOCUMENTS

| | | |
|---|---|---|
| 2021/0342976 A1 | 11/2021 | Navarrete Michelini |
| 2022/0019856 A1 | 1/2022 | Lee |
| 2025/0013921 A1* | 1/2025 | Moradi .................. G06N 3/082 |

FOREIGN PATENT DOCUMENTS

| | | |
|---|---|---|
| WO | 20202343881 W | 11/2020 |
| WO | 20211148401 W | 6/2021 |

OTHER PUBLICATIONS

Trofimov, Alexander G., and Anastasia A. Bogatyreva. "A method of choosing a pre-trained convolutional neural network for transfer learning in image classification problems." International Conference on Neuroinformatics. Cham: Springer International Publishing, 2019. (Year: 2019).*

Chunheng Jiang, Tejaswini Pedapati, Pin-Yu Chen, Yizhou Sun, Jianxi Gao, Neural Capacitance: A New Perspective of Neural Network Selection via Edge Dynamics, submission to ICLR 2022, made available on-line on Sep. 28, 2021 (modified: Nov. 20, 2021). (Grace Period Disclosure).

Baker et al. "Accelerating neural architecture search using performance prediction." arXiv preprint arXiv:1705.10823, Nov. 8, 2017, 14 pages.

Chandrashekaran et al. "Speeding up hyperparameter optimization by extrapolation of learning curves using previous builds" In Joint European Conference on Machine Learning and Knowledge Discovery in Databases, Jan. 1, 2017, pp. 477-492.

Domhan et al. "Speeding up automatic hyperparameter optimization of deep neural networks by extrapolation of learning curves" In Twenty-fourth International Joint Conference on Artificial Intelligence, Jul. 25, 2015, 9 pages.

Tano et al. "Accelerating training in artificial neural networks with dynamic mode decomposition." arXiv preprint arXiv:2006.14371, Jun. 2020, 13 pages.

Wistuba et al. "Learning to rank learning curves" In International Conference on Machine Learning, arXiv:2006.03361v1 [cs.LG], Jun. 5, 2020, pp. 10303-10312.

* cited by examiner

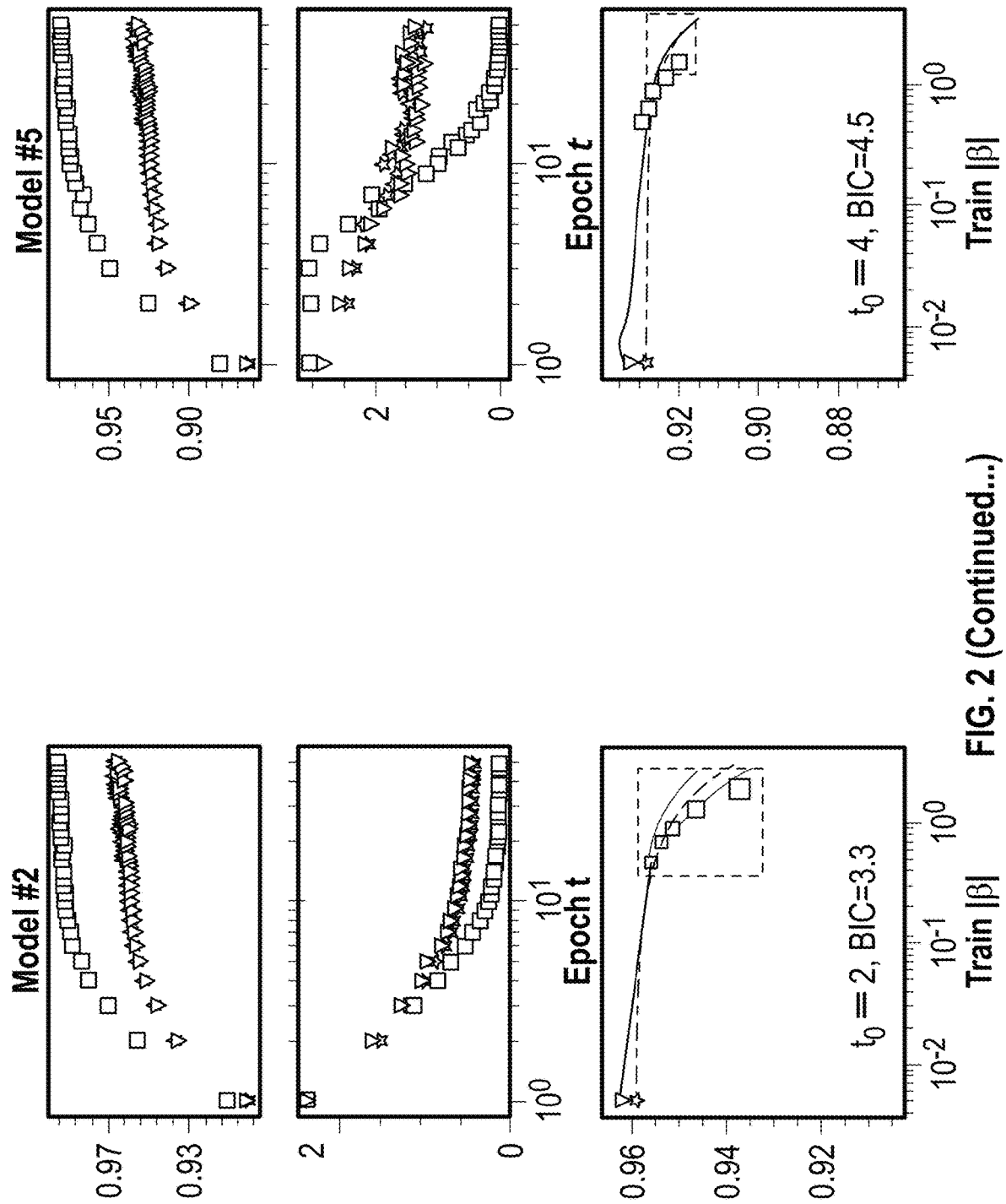
FIG. 2 (Continued...)

| Dataset    | Dataset #1 |      | Dataset #2 |      | Dataset #3 |      | Dataset #4 |      | Dataset #5 |      |
|------------|------|------|------|------|------|------|------|------|------|------|
| LLC        | 5    | 10   | 5    | 10   | 5    | 10   | 5    | 10   | 5    | 10   |
| Embodiment | 0.93 | 0.98 | 0.77 | 0.80 | 0.84 | 0.88 | 0.95 | 0.89 | 0.74 | 0.79 |
| Baseline #1| 0.86 | 0.89 | 0.55 | 0.80 | 0.74 | 0.78 | 0.53 | 0.60 | 0.52 | 0.61 |
| Baseline #2| 0.85 | 0.87 | 0.55 | 0.80 | 0.73 | 0.70 | 0.49 | 0.45 | 0.48 | 0.45 |
| Baseline #3| 0.74 | 0.78 | 0.45 | 0.60 | 0.63 | 0.65 | 0.57 | 0.59 | 0.53 | 0.52 |
| Baseline #4| 0.85 | 0.85 | 0.50 | 0.58 | 0.44 | 0.10 | 0.55 | 0.61 | 0.50 | —    |
| Imprv (%)  | 9.1  | 10.2 | 38.3 | -0.9 | 12.4 | 13.3 | 65.3 | 49.2 | 40.1 | 30.6 |

|  | Example | | Baseline | | |
| Dataset | Embodiment | #3 | #2 | #1 | #4 |
| --- | --- | --- | --- | --- | --- |
| Dataset #1 | 0.491 | 0.610 | 0.059 | 0.049 | 3966.128 |
| Dataset #2 | 0.414 | 0.628 | 0.051 | 0.045 | 5256.478 |
| Dataset #3 | 0.506 | 0.607 | 0.074 | 0.044 | 4690.507 |
| Dataset #4 | 0.493 | 0.625 | 0.057 | 0.046 | 4552.194 |
| Dataset #5 | 0.460 | 0.636 | 0.071 | 0.044 | 4734.992 |

NEURAL CAPACITANCE: NEURAL NETWORK SELECTION VIA EDGE DYNAMICS

STATEMENT REGARDING PRIOR DISCLOSURES BY THE INVENTOR OR A JOINT INVENTOR

The following disclosure(s) are submitted under 35 U.S.C. 102(b)(1)(A):

Chunheng Jiang, Tejaswini Pedapati, Pin-Yu Chen, Yizhou Sun, Jianxi Gao, Neural Capacitance: A New Perspective of Neural Network Selection via Edge Dynamics, submission to ICLR 2022, made available on-line on 28 Sep. 2021 (modified: 20 Nov. 2021).

BACKGROUND

The present invention relates to the electrical, electronic and computer arts, and more specifically, to machine learning systems.

Leveraging a pre-trained neural network (i.e., a source model) and fine-tuning it to solve a target task is a common and effective practice in deep learning, such as transfer learning. Transfer learning has been widely used to solve complex tasks in the text and vision domains. In vision, models trained on a conventional image database are leveraged to solve diverse tasks such as image classification and object detection. In text, language models that are trained on a large amount of public data including books, free online encyclopedia(s), and the like are employed to solve tasks such as classification and language generation. Although such techniques can achieve good performance on a target task, a fundamental yet challenging problem is how to select a suitable pre-trained model from a pool of candidates in an efficient manner. The naive solution of training each candidate fully with the target data can find the best pre-trained model but is infeasible due to considerable consumption of time and computational resources.

Efficient model selection for identifying a suitable pre-trained neural network to a downstream task is a fundamental yet challenging task in deep learning. Current practice requires expensive computational costs in model training for performance prediction. Current learning curve (LC) prediction approaches make predictions based on numerous previous observations from other learning curves, or depend on the embedding of the network topology, dataset, and hyper-parameters, which are very expensive.

SUMMARY

Principles of the invention provide techniques for neural network selection via edge dynamics. In one aspect, an exemplary method includes the operations of removing, using at least one processor, an output layer from a pre-trained neural network model; incorporating, using the at least one processor, a neural capacitance probe (NCP) unit with multiple layers on top of one or more bottom layers of the pre-trained neural network model; randomly initializing, using the at least one processor, the neural capacitance probe (NCP) unit; training, using the at least one processor, a modified neural network model by fine-tuning the one or more bottom layers on a target dataset for a maximum number of epochs, the modified neural network model comprising the neural capacitance probe (NCP) unit incorporated with multiple layers on top of the one or more bottom layers of the pre-trained neural network model; obtaining, using the at least one processor, an adjacency matrix from the initialized neural capacitance probe (NCP) unit; computing, using the at least one processor, a neural capacitance metric using the adjacency matrix; selecting, using the at least one processor, an active model using the neural capacitance metric; and configuring, using the at least one processor, a machine learning system using the active model.

In one aspect, a non-transitory computer readable medium comprises computer executable instructions which when executed by a computer cause the computer to perform the method of removing an output layer from a pre-trained neural network model; incorporating a neural capacitance probe (NCP) unit with multiple layers on top of one or more bottom layers of the pre-trained neural network model; randomly initializing the neural capacitance probe (NCP) unit; training a modified neural network model by fine-tuning the one or more bottom layers on a target dataset for a maximum number of epochs, the modified neural network model comprising the neural capacitance probe (NCP) unit incorporated with multiple layers on top of the one or more bottom layers of the pre-trained neural network model; obtaining an adjacency matrix from the initialized neural capacitance probe (NCP) unit; computing a neural capacitance metric using the adjacency matrix; selecting an active model using the neural capacitance metric; and configuring a machine learning system using the active model.

In one aspect, an apparatus comprises a memory and at least one processor, coupled to the memory, and operative to perform operations comprising removing an output layer from a pre-trained neural network model; incorporating a neural capacitance probe (NCP) unit with multiple layers on top of one or more bottom layers of the pre-trained neural network model; randomly initializing the neural capacitance probe (NCP) unit; training a modified neural network model by fine-tuning the one or more bottom layers on a target dataset for a maximum number of epochs, the modified neural network model comprising the neural capacitance probe (NCP) unit incorporated with multiple layers on top of the one or more bottom layers of the pre-trained neural network model; obtaining an adjacency matrix from the initialized neural capacitance probe (NCP) unit; computing a neural capacitance metric using the adjacency matrix; selecting an active model using the neural capacitance metric; and configuring a machine learning system using the active model.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

a novel framework of neural network training based on network science and complex systems;

improve the technological process of computerized machine learning via prediction of a best-performing machine learning model from a set of candidate machine learning models while consuming a reduced amount of computing resources in comparison to conventional neural network model selection techniques;

a machine learning system configured with an optimal model selected from a set of candidate neural network models;

a machine learning system for image classification, object detection, classification and language generation, and the like;

a mapping of layered neural networks to directed graphs over parameters;

a neural capacitance metric $\beta_{eff}$ for identifying the best model from a set of neural network models;

lightweight computation that reduces consumption of computing resources;

a novel framework of neural network training that applies to a variety of neural network architectures; and a robust ranking performance even in a reduced data environment.

These and other features and advantages of the present invention will become apparent from the following detailed description of illustrative embodiments thereof, which is to be read in connection with the accompanying drawings.

DETAILED DESCRIPTION

Figure 1A:
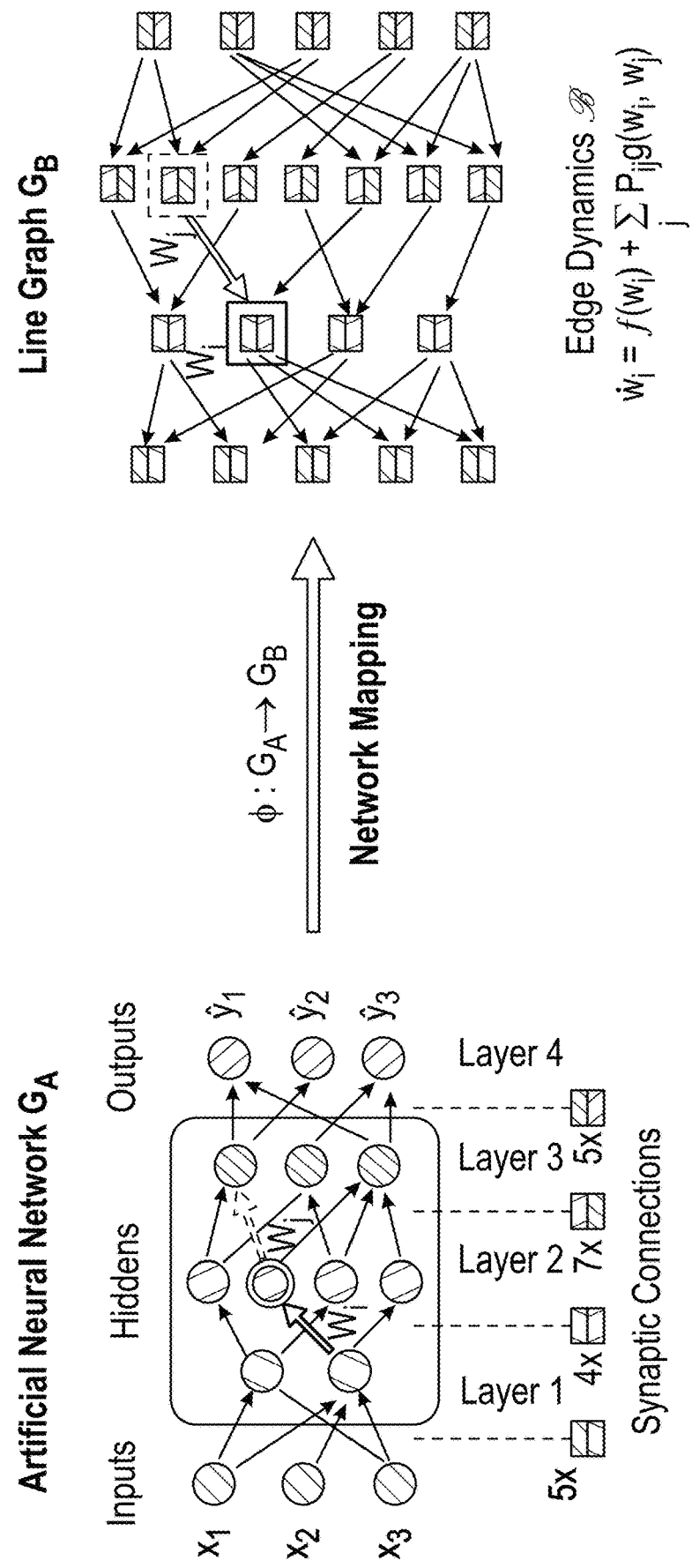
FIG. 1A depicts a mapping of an example multilayer perceptron (MLP) $G_A$ to a directed line graph $G_B$, which is governed by an edge dynamics B, in accordance with an example embodiment.

Generally, a novel framework for neural network selection based on analyzing the governing dynamics over synaptic connections (edges) during training is introduced. The disclosed framework is built on the recognition that back-propagation during neural network training is equivalent to the dynamical evolution of synaptic connections. Therefore, a converged neural network is associated with an equilibrium state of a networked system composed of those edges. To this end, a network mapping p is constructed, converting a neural network $G_A$ to a directed line graph $G_B$ that is defined on those edges in $G_A$. Next, a neural capacitance metric $\beta_{eff}$ is derived as a predictive measure universally capturing the generalization capability of $G_A$ on the downstream task using only a handful of early training results. In one or more example embodiments, the neural capacitance metric $\beta_{eff}$ is based on early training results; that is, after a few epochs of training and prior to convergence of a loss function associated with the training.

Extensive experiments using 17 popular pre-trained image models and five benchmark datasets to evaluate the fine-tuning performance of the disclosed framework were conducted. The neural capacitance metric utilized is shown to be a powerful indicator for model selection based only on early training results and is more efficient than state-of-the-art methods.

INTRODUCTION

As described above, efficient model selection for identifying a suitable pre-trained neural network for a downstream task is a fundamental yet challenging task in deep learning. Current practice requires expensive computational costs in model training for performance prediction. One or more embodiments advantageously provide an efficient predictive measure to capture the performance of a pre-trained model on the target task based only on early training results (e.g., predicting final model performance based on the statistics obtained from the first few training epochs).

In order to implement an efficient neural network (NN) model selection, a novel framework is introduced to forecast the predictive ability of a model with its cumulative information in the early phase of NN training, as practiced in learning curve prediction. Most conventional techniques for learning curve prediction aim to capture the trajectory of learning curves with a regression function of the models' validation accuracy. Some of the previous algorithms developed in this field require training data from additional learning curves to train the predictors; the disclosed model does not require any such data. It solely relies on the NN architecture. Ranking models according to their final accuracy after fine-tuning is significantly more challenging, as the learning curves are very similar to each other.

The entire NN training process involves iterative updates of the weights of synaptic connections, according to one particular optimization algorithm, e.g., gradient descent or stochastic gradient descent (SGD). In essence, many factors impact how weights are updated, including the training data, the neural architecture, the loss function, and the optimization algorithm. Moreover, weights evolving during NN training in many aspects can be viewed as a discrete dynamical system. The perspective of viewing NN training as a dynamical system has been studied by the community, and many attempted to make some theoretical explanation of the convergence rate and generalization error bounds.

A disadvantage of conventional approaches is that they concentrate on the macroscopic and collective behavior of the system, and lack a dedicated examination of the individual interactions between the trainable weights or synaptic connections, which are pertinent in developing an understanding of the dependency of these weights, and how they co-evolve during training. To fill the gap, one or more embodiments address, from a microscopic perspective, building edge dynamics of synaptic connections from SGD in terms of differential equations, from which an associated network is built as well. The edge dynamics induced from SGD are nonlinear and highly coupled. It will be very challenging to solve, considering millions of weights in many convolutional neural networks (CNNs), e.g., 16 million weights in a first conventional model and 528 million in a second conventional model. A universal topological metric for the associated network to decouple the system has previously been proposed. The metric will be used for model selection in the disclosed approach, and it is shown to be powerful in the search of the best predictive model.

Figure 1B:
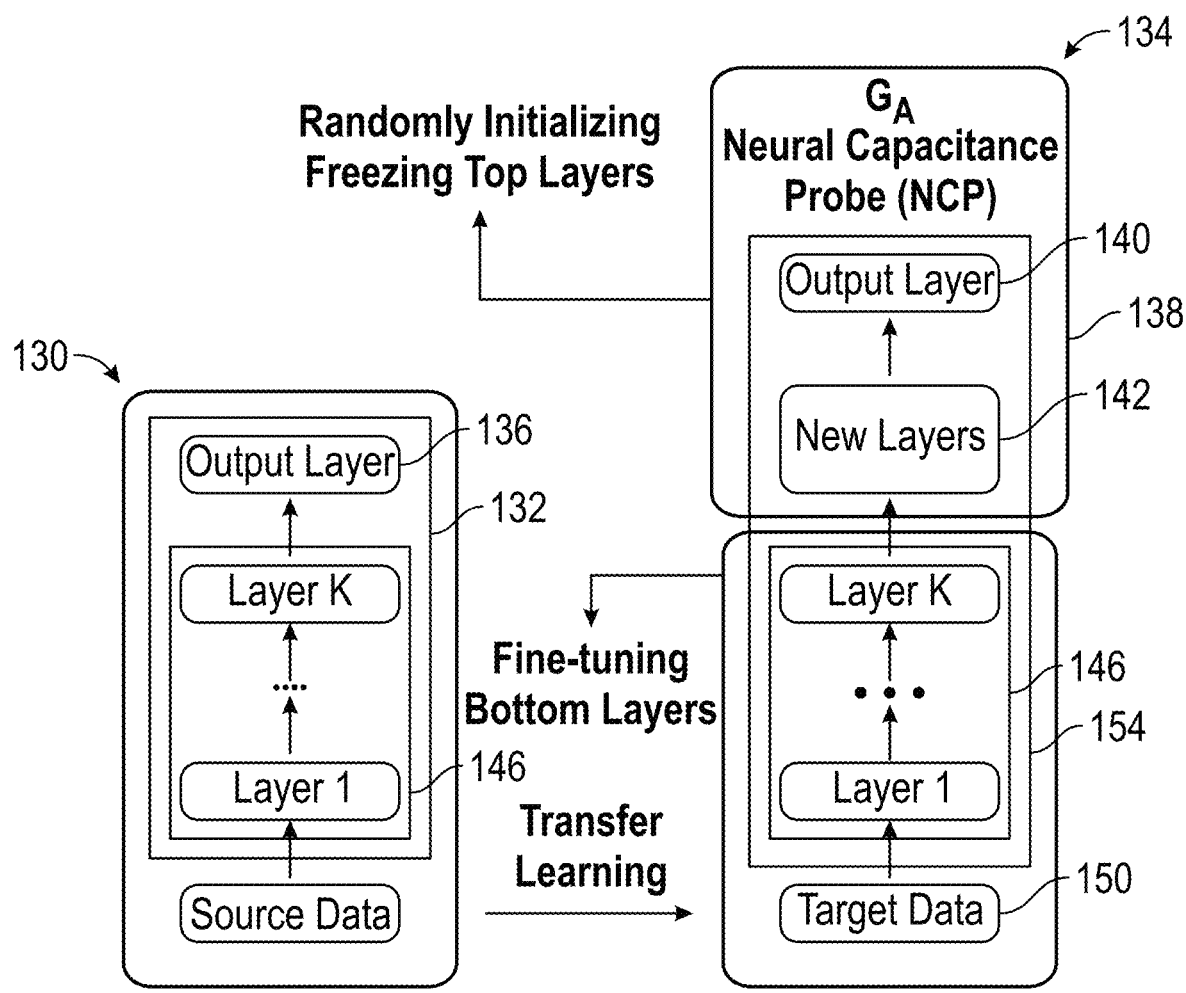
FIG. 1B is a diagram of transfer learning from the source domain (left stack) to a target domain (right stack), in accordance with an example embodiment.
Figure 1C:
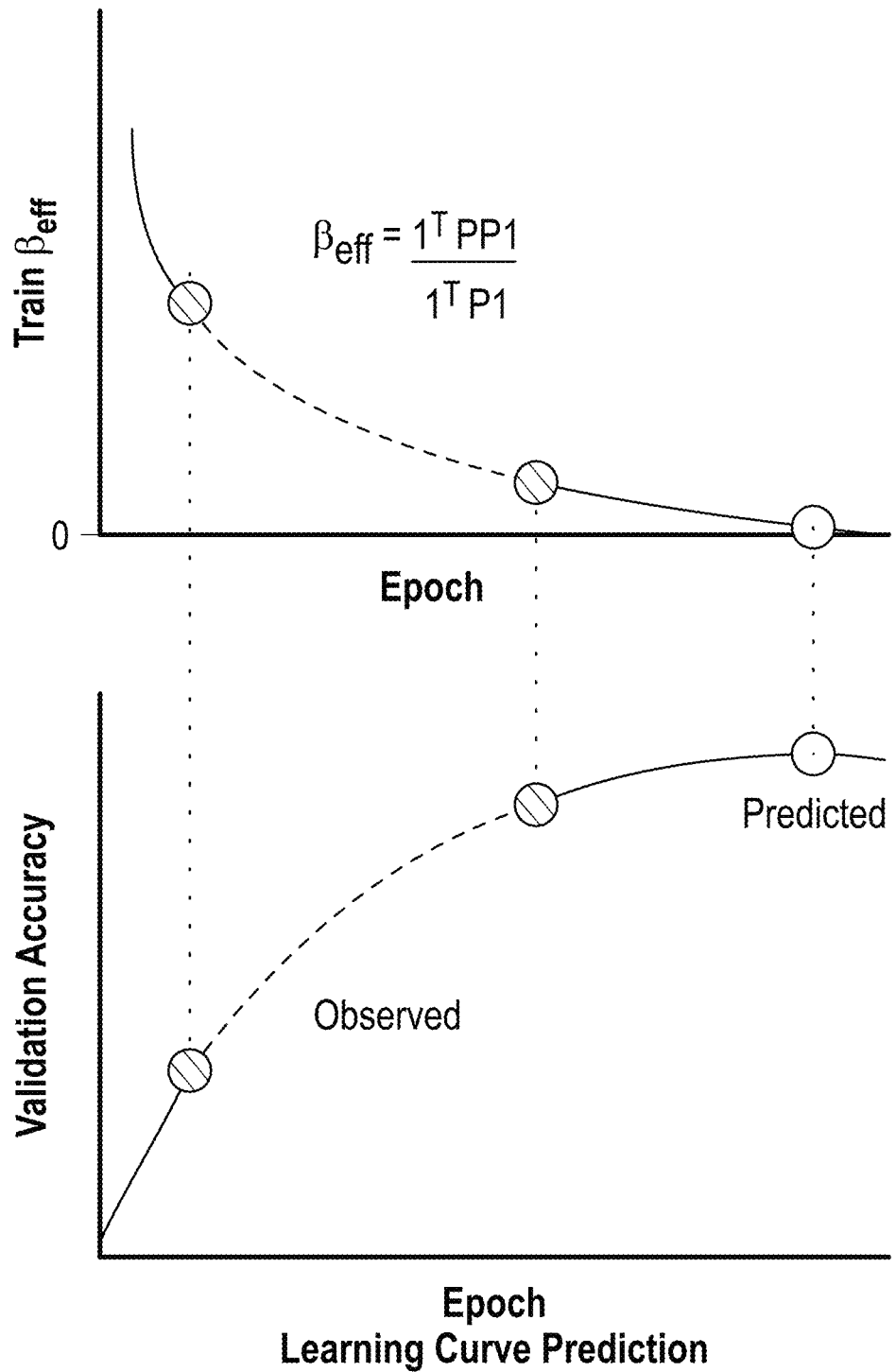
FIG. 1C illustrates the observed partial learning curves of validation accuracy over the early-stage training epochs and the corresponding neural capacitance metric $\beta_{eff}$ during fine-tuning, in accordance with an example embodiment.

FIGS. 1A-1C illustrate a first example framework, in accordance with an example embodiment. FIG. 1A depicts a mapping 100 of an example multilayer perceptron (MLP) $G_A$ to a directed line graph $G_B$, which is governed by an edge dynamics (weight interactions) B, in accordance with an example embodiment. Each node (square) of $G_B$ is associated with a synaptic connection linking two neurons (in different fill patterns) from different layers of $G_A$. In one example embodiment, the multilayer perceptron (MLP) $G_A$ is implemented as a data structure defining layers and the associated weights of a neural network and the directed line graph $G_B$ is implemented as data structure that defines the nodes and edges of the directed line graph $G_B$. Aspects of the invention can be implemented using a conventional, Von Neumann, processor-and-memory architecture, as discussed below. On the other hand, some embodiments can be implemented in alternative processor architectures, such as non-Von Neumann architectures with computation in memory. The skilled artisan will be familiar with the computerized implementation of neural networks and their layers.

FIG. 1B is a diagram of transfer learning from the source domain 130 (left stack) to a target domain 134 (right stack), in accordance with an example embodiment. The pre-trained model 132 is modified by adding additional layers 140, 142, i.e. installing a neural capacitance probe (NCP) unit 138, on top of the bottom layers 146. The NCP unit 138 is frozen with a set of randomly initialized weights, and only the bottom layers 146 are fine-tuned. (Layers 136, 140, 142, 146 are implemented with data structures in memory.)

FIG. 1C illustrates the observed partial learning curves (dashed line segments) of validation accuracy over the early-stage training epochs and the corresponding neural capacitance metric $\beta_{\textit{eff}}$ during fine-tuning, in accordance with an example embodiment. The predicted final accuracy at $\beta_{\textit{eff}} \rightarrow 0$ (hollow dot) is used to select the best model from a set of models. The metric $\beta_{\textit{eff}}$ relies on $G_B$'s weighted adjacency matrix P, which itself is derived from the reformulation of the training dynamics. To predict the performance, a lightweight $\beta_{\textit{eff}}$ of the NCP unit 138 is used instead of the heavyweight one over the entire network on the right stack (target domain 134) of FIG. 1B. Certain pertinent aspects of an exemplary framework according to one or more embodiments are presented below:

NN training is viewed as a dynamical system over synaptic connections, and the first study on the interactions of synaptic connections in a microscopic perspective is delivered;

reformulated neural training dynamics and development of a neural capacitance metric $\beta_{\textit{eff}}$ for NN model selection;

empirical experiments of seventeen pre-trained models on five benchmark datasets illustrate that an exemplary embodiment outperforms current learning curve prediction approaches; and one or more embodiments improve by 9.1/38.3/12.4/65.3/40.1% on five conventional datasets over the best baseline with observations from early learning curves with a length of only five epochs (when predicting the relative ranking of pre-trained models with respect to their final performance).

Dynamical System of a Network

Many real complex systems, e.g., plant-pollinator interactions and the spread of infectious disease, can be described with networks. Let G=(V, E) be a network with nodes V and edges E. Assuming n=|V|, the interactions between nodes can be formulated as a set of differential equations:

$$\dot{x}_i = f(x_i) + \Sigma_{j \in V} P_{ij} g(x_i, x_j), \forall i \in V, \quad (1)$$

where $x_i$ is the state of node i. In real systems, this could correspond to the abundance of a plant in an ecological network, the infection rate of a person in an epidemic network, or the expression level of a gene in a regulatory network. The term P is the adjacency matrix of G, where the entry $P_{ij}$ indicates the interaction strength between nodes i and j. The functions $f(\cdot)$ and $g(\cdot, \cdot)$ capture the internal and external impacts on node i, respectively.

Usually, the functions $f(\cdot)$ and $g(\cdot, \cdot)$ are nonlinear.

Let $x = (x_1, x_2, \ldots, x_n)$. For a small network, given an initial state, a forward simulation can be run for an equilibrium state $x^*$, such that $\dot{x}_i = f(x_i^*) + \Sigma_{j \in V} P_{ij} g(x_i^*, x_j^*) = 0$.

However, when the size of the system goes up to millions or even billions, it will pose a significant challenge to solve the coupled differential equations. The problem can be efficiently addressed by employing a mean-field technique, where a linear operator $\mathcal{L}_P(\cdot)$ is introduced to decouple the system. Specifically, $\mathcal{L}_P$ depends on the adjacency matrix P and is defined as $$\mathcal{L}_P(z) = \frac{1^T P z}{1^T P 1}, \quad (2)$$

where $z \in \mathcal{R}^n$. Let $\delta_{in} = P1$ and $\delta_{out} = 1^T P$ be the in- and out-degrees of nodes. For a weighted G, the degrees are weighted as well. Applying $\mathcal{L}_P(\cdot)$ to $\delta_{in}$ gives:

$$\beta_{eff} = \mathcal{L}_P(\delta_{in}) = \frac{1^T P \delta_{in}}{1^T \delta_{in}} = \frac{\delta_{out}^T \delta_{in}}{1^T \delta_{in}}, \quad (3)$$

which proves to be a powerful metric to measure the resilience of networks, and has been applied to make reliable inferences from incomplete networks. It is used to measure the predictive ability of a NN (see section entitled "Neural Capacitance"), whose training is, in essence, a dynamical system.

NN Training is a Dynamical System

Conventionally, training a NN is a nonlinear optimization problem. Because of the hierarchical structure of NNs, the training procedure is implemented by two alternate procedures: forward-propagation (FP) and back-propagation (BP), as illustrated in FIG. 1A. During FP, data goes through the input layer, hidden layers, up to the output layer 136, which produces the predictions of the input data. The differences between the outputs and the labels of the input data are used to define an objective function C, a.k.a training error function. BP proceeds to minimize C, in a reverse way as was done in FP, by propagating the error from the output layer 136 down to the input layer. The trainable weights of synaptic connections are updated accordingly.

Let $G_A$ be a NN, w be the flattened weight vector of $G_A$, and z be the activation values. As a whole, the training of $G_A$ can be described with two coupled dynamics: $\mathcal{A}$ on $G_A$, and $\mathcal{B}$ on $G_B$, where nodes in $G_A$ are neurons, and nodes in $G_B$ are the synaptic connections. The coupling relation arises from the strong inter-dependency between z and w: the states z (activation values or activation gradients) of $G_A$ are the parameters of $\mathcal{B}$, and the states w of $G_B$ are the trainable parameters of $G_A$. If the whole training process is put in the context of networked systems, $\mathcal{A}$ denotes a node dynamics because the states of nodes evolve during FP, and $\mathcal{B}$ expresses an edge dynamics because of the updates of edge weights during BP. Mathematically, the node and edge dynamics are formulated based on the gradients of C:

$$(\mathcal{A}) \quad \frac{dz}{dt} \approx h_{\mathcal{A}}(z, t; w) = -\nabla_z C(z(t)), \quad (4)$$

$$(\mathcal{B}) \quad \frac{dw}{dt} \approx h_{\mathcal{B}}(w, t; z) = -\nabla_w C(w(t)), \quad (5)$$

where t denotes the training step. Let $a_i^{(\ell)}$ be the pre-activation of node i on layer $\ell$, and $\sigma_\ell(\cdot)$ be the activation function of layer $\ell$. Usually, the output activation function is a softmax. The hierarchical structure of $G_A$ exerts some constraints over $z_i^{(\ell)}$ for neighboring layers, i.e., $z_i^{(\ell)} = \sigma_\ell(a_i^{(\ell)}), 1 \le i \le n_\ell, \forall 1 \le \ell < L$ and $z_k^{(L)} = \exp\{a_k^{(L)}\}/\Sigma_j \exp\{a_j^{(L)}\}, 1 \le k \le n_L$, where $n_\ell$ is the total number of neurons on layer $\ell$, and $G_A$ has L+1 layers. It also presents a dependency between z and w, e.g., when $G_A$ is an MLP without bias, $a_i^{(\ell)} = w_i^{(\ell)T} z^{(\ell-1)}$, which builds a connection from $G_A$ to $G_B$. Given w, the activation z satisfying all these constraints, is also a fixed point of $\mathcal{A}$. Meanwhile, an equilibrium state of $\mathcal{B}$ provides a set of optimal weights for $G_A$.

Framework

The metric $\beta_{eff}$ is a universal metric to characterize different types of networks, including biological neural networks. Because of the generality of $\beta_{eff}$, how it looks on artificial neural networks which are designed to mimic the biological counterparts for general intelligence is analyzed. Therefore, an analogue system for the trainable weights is set up. To this end, a line graph for the trainable weights (see section entitled "Line Graph $G_B$") is built, and the training dynamics are reformulated in the same form of the general dynamics (Eq. (1)) (see section entitled "Edge Dynamics $\mathcal{B}$"). The reformulated dynamics reveals a simple yet powerful property regarding $\beta_{eff}$ (see section entitled "Neural Capacitance"), which is utilized to predict the final accuracy of $G_A$ with a few observations during the early phase of the training (see section entitled "Model Selection with $\beta_{eff}$").

Line Graph $G_B$

In one example embodiment, a mapping scheme $\phi$: $G_A \mapsto G_B$ is built from an NN $G_A$ to an associated graph $G_B$. The topology of the synaptic connections (edges) is established as a well-defined line graph, and nodes of $G_B$ are the synaptic connections of $G_A$. The skilled artisan will be familiar with suitable line graphs such as, for example, in Tamás Nepusz and Tamis Vicsek, Controlling edge dynamics in complex networks, Nature Physics, 2012 Jul. 8(7) pages 568-73, and given the teachings herein, can select suitable line graphs to implement one or more embodiments. More precisely, each node in $G_B$ is associated with a trainable parameter in $G_A$. For an MLP, each synaptic connection is assigned a trainable weight, the edge set of $G_A$ is also the set of synaptic connections of $G_B$. For a convolutional neural network (CNN), this one-to-one mapping from neurons on layer $\ell$ to layer $\ell+1$ is replaced by a one-to-many mapping because of weight-sharing, e.g., a parameter in a convolutional filter is repeatedly used in FP and associated with multiple pairs of neurons from the two neighboring layers. Since the error gradients flow in a reversed direction, the corresponding links of the proposed line graph for $G_B$ are reversed. Specifically, given any pair of nodes in $G_B$, if they share an associated intersection neuron in FP propagation routes, a link with a reversed direction will be created for them. FIG. 1A demonstrates how the mapping is performed on an example MLP. The topology of $G_B$ is in place, but the weights of links in $G_B$ are not yet specified. To make up for these missing components, the interactions of synaptic connections from SGD are revealed, the interaction strengths are quantified, and then the weights of links in $G_B$ are defined accordingly. Related technical details are disclosed below.

Edge Dynamics $\mathcal{B}$

In SGD, each time a batch of samples are chosen to update w, w←w−α$\nabla_w$C, where α>0 is the learning rate. When desired conditions are met, training is terminated. Let $\delta^{(\ell)}=[\partial C/\partial z_1^{(\ell)}, \ldots, \partial C/\partial z_{n_\ell}^{(\ell)}]^T \in R^{n_\ell}$ be the activation gradients, and $\sigma_\ell = [\sigma_{\ell,1}, \ldots, \sigma_{\ell,n_\ell}]^T \in R^{n_\ell}$ be the derivatives of activation function $\sigma$ for layer $\ell$, with $\sigma_{\ell,k} = \sigma_\ell'(a_k^{(\ell)})$, $1 \le k \le n_\ell$, $1 \le \ell \le L$. (In some literature $\delta^{(\ell)}$ is defined as gradients with respect to $a^{(\ell)}$, which does not affect the present analysis.) To understand how the weights $W^{(\ell)}$ affect each other, $\delta^{(\ell)}$ is explicitly expanded and the result is $\delta^{(\ell)} = W^{(\ell+1)T}(W^{(\ell+2)T}(\ldots(W^{(L-1)T}(W^{(L)T}(z^{(L)}-y))\odot\sigma_{L-1}')\ldots)\odot\sigma_{\ell+2}')\odot\sigma_{\ell+1}'$, where $\odot$ is the Hadamard product. $W^{(\ell)}$ is found to be associated with all accessible parameters on downstream layers, and the recursive relation defines a high-order hyper-network interaction between any $W^{(\ell)}$ and the other parameters. With the fact that $x\odot y=\Lambda(y)x$, where $\Lambda(y)$ is a diagonal matrix with the entries of y on the diagonal, $\delta^{(\ell)} = W^{(\ell+1)T}\Lambda(\sigma_{\ell+1}')\delta^{(\ell+1)} = W^{(\ell+1)T}\Lambda(\sigma_{\ell+1}')W^{(\ell+2)T}\Lambda(\sigma_{\ell+2}')\ldots W^{(L-1)T}\Lambda(\sigma_{L-1}')W^{(L)}\tau(z^{(L)}-y)$. For a ReLU (Rectified Linear Unit) activation function $\sigma_\ell \odot$, $\sigma_\ell'$ is binary depending on the sign of the input pre-activation values $a^{(\ell)}$ of layer $\ell$. If $a_i^{(\ell)} \le 0$, then $\sigma_\ell'(a_i^{(\ell)})=0$, blocking a BP propagation route of the prediction deviations $z^{(L)}-y$ and giving rise to vanishing gradients.

One or more embodiments build direct interactions between synaptic connections. This can be done, for example, by identifying which units provide direct physical interactions to a given unit and appear on the right-hand side of its differential equation $\mathcal{B}$ in Eq. (4), and how much such interactions come into play. There are multiple routes to build up a direct interaction between any pair of network weights from different layers, as presented by the product terms in $\delta^{(\ell)}$. However, the coupled interaction makes it an impossible task, which is well known as a credit assignment problem. One or more embodiments advantageously provide a remedy. The impacts of all the other units on $W^{(\ell)}$ are approximated by direct, local impacts from $W^{(\ell+1)}$, and the others' contribution as a whole is encoded in the activation gradient $\delta^{(\ell+1)}$.

Moreover, the weight gradient is $$\nabla_{W^{(\ell)}} = \Lambda(\sigma_\ell')\delta^{(\ell+1)}z^{(\ell-1)T} \quad (6)$$
$$= \Lambda(\sigma_\ell')W^{(\ell+1)T}\Lambda(\sigma_{\ell+1}')\delta^{(\ell+1)}z^{(\ell-1)T},$$

which shows the dependency of $W^{(\ell)}$ on $W^{(\ell+1)}$, and itself can be viewed as an explicit description of the dynamical system $\mathcal{B}$ in Eq. (4). Putting it in terms of a differential equation:

$$\frac{\partial W^{(\ell)}}{dt} = -\Lambda(\sigma_\ell')W^{(\ell+1)T}(\sigma_{\ell+1}')\delta^{(\ell+1)}z^{(\ell-1)T} \quad (7)$$
$$\triangleq F(W^{(\ell+1)})$$

Because of the mutual dependency of the weights and the activation values, it is difficult to make an exact decomposition of the impacts of different parameters on $W^{(\ell)}$. However, in the gradient $\nabla_{W^{(\ell)}}$, $W^{(\ell+1)}$ presents as an explicit term and contributes the direct impact on $W^{(\ell)}$. To capture such direct impact and derive the adjacency matrix P for $G_B$, Taylor expansion is applied on $\nabla_{W^{(\ell)}}$ and the result is:

$$P^{(\ell,\ell+1)} = \frac{\partial^2 C}{\partial W^{(\ell)}\partial W^{(\ell+1)}}, \quad (8)$$

which defines the interaction strength between each pair of weights from layer $\ell+1$ to layer $\ell$. Let $w=(w_1, w_2, \ldots)$ be a flattened vector of all trainable weights of $G_A$. Given a pair of weights $w_i$ and $w_j$, one from layer $\ell_1$, another from layer $\ell_2$. If $\ell_2 = \ell_1 + 1$, the entry $P_{ij}$ is defined according to Eq. (8), otherwise $P_{ij}=0$. Considering the scale of the trainable parameters in $G_A$, P is very sparse.

Let $W^{(\ell+1)*}$ be the equilibrium states, the training dynamics Eq. (7) is reformulated into the form of Eq. (1), and gives the edge dynamics $\mathcal{B}$ for $G_B$:

$$\dot{w}_i = f(w_i) + \Sigma_j P_{ij} g(w_i, w_j), \quad (9)$$

with $f(w_i)=F(w_i^*)$ and $g(w_i, w_j)=w_j-w_j^*$. The value of weights at an equilibrium state $\{w_j^*\}$ is unknown, but it is a constant and does not affect the computing of $\beta_{eff}$.

Neural Capacitance

According to Eq. (8), the weighted adjacency matrix P of $G_B$ is in place. Now, the total impact that a trainable parameter (or synaptic connection) receives from itself and the others, which corresponds to the weighted in-degrees $\delta_{in}=P\mathbf{1}$, can be quantified. Applying $\mathcal{L}_P(\cdot)$ (see Eq. (2)) to $\delta_{in}$, a "counterpart" metric $\beta_{eff}=\mathcal{L}_P(\delta_{in})$ is obtained to measure the predictive ability of a neural network $G_A$, as the resilience metric (see Eq. (3)) does to a general network G (see Dynamical system of a network as discussed above). If $G_A$ is an MLP, the entries of P, and hence $\beta_{eff}$, can be explicitly written:

$$\beta_{eff} = \frac{\mathbf{1}^T P \delta_{in}}{\mathbf{1}^T \delta_{in}} = \frac{\delta_{out}^T \delta_{in}}{\mathbf{1}^T \delta_{in}}. \quad (10)$$

Moreover, in Theorem 4.1 below, it is proven that as $G_A$ converges, $\nabla_W^{(\ell)}$ vanishes, and $\beta_{eff}$ approaches zero.

Theorem 4.1

Let ReLU be the activation function of $G_A$. When $G_A$ converges, then $\beta_{eff}=0$. (A small value $\varepsilon$ is added to the denominator of Eq. (10) to avoid a possible 0/0. Moreover, because of the numerical precision, it is rare to reach 0/0.)

Algorithm 1

Implement NCP and Compute $\beta_{eff}$

Input: A pre-trained model $\mathcal{F}_s=\{\mathcal{F}_s^{(1)}, \mathcal{F}_s^{(2)}\}$ 132 with bottom layers $\mathcal{F}_s^{(1)}$ 146 and output layer $\mathcal{F}_s^{(2)}$ 136, a target dataset $D_t$, the maximum number of epochs T 1: Remove $\mathcal{F}_s^{(2)}$ 136 from $\mathcal{F}_s$ 132 and add on top of $\mathcal{F}_s^{(1)}$ 146 an NCP unit $\mathcal{U}$ 138 with multiple layers 140, 142 (FIG. 1B)

2: Randomly initialize the NCP unit $\mathcal{U}$ 138

3: Train $\mathcal{F}_t=\{\mathcal{F}_s^{(1)}, \mathcal{U}\}$ 154 by fine-tuning $\mathcal{F}_s^{(1)}$ 146 on $D_t$ 150 for epochs of T 4: Obtain P from NCP unit $\mathcal{U}$ 138 according to Eq. (8)

5: Compute $\beta_{eff}$ with P according to Eq. (10)

(In some example embodiments, the NCP unit $\mathcal{U}$ 138 is randomly initialized and frozen during step 2.) For an MLP $G_A$, it is possible to derive an analytical form of $\beta_{eff}$. However, it becomes extremely complicated for a deep NN with multiple convolutional layers. To realize $\beta_{eff}$ for deep NNs in any form, the automatic differentiation implemented in conventional deep learning platforms that support automatic differentiation is taken advantage of. Considering the number of parameters, it is still computationally expensive, and prohibitive to calculate a $\beta_{eff}$ for the entire $G_A$.

Because of this, the derivation of a surrogate from a partial of $G_A$ is sought. As shown in the section entitled "Model Selection with $\beta_{eff}$", a neural capacitance probe (NCP) unit 138 is inserted, i.e., putting additional layers 140, 142 on top of the neural network $G_A$, excluding the original output layer 136, and the predictive ability of the entire $G_A$ using $\beta_{eff}$ of the NCP unit 138 is estimated. Therefore, in the context of model selection from a pool of pre-trained models, if no confusion arises, $\beta_{eff}$ is called a neural capacitance.

Model Selection with $\beta_{eff}$

Consider application of the neural capacitance $\beta_{eff}$ to model selection. For example, the pre-trained models 132 are transferred by (i) removing the output layer 136, (ii) adding some layers 140, 142 on top of the remaining layers 146 (FIG. 1), and fine-tuning the additional layers 140, 142. In a non-limiting example, the fine-tuning is performed using a "small" learning rate, where "small," in one or more embodiments, is defined as a learning rate less than $10^{-3}$ in comparison to training that attains convergence of a loss function associated with the training. As shown in Algorithm 1 above, the newly added layers $\mathcal{U}$ 140, 142 on top of the bottom layers 146 of $\mathcal{F}_S$ 36 are used as an NCP unit 138. The specifics of the NCP unit 138 are detailed in the section entitled "Experiments and Results." In one or more embodiments, the NCP 138 is not involved in fine-tuning, and is merely used to calculate $\beta_{eff}$, and then to estimate the performance of $G_A$ over the target domain $D_t$.

According to Theorem 4.1, when the model converges, $\beta_{eff} \rightarrow 0$. In an indirect way, the predictive ability of the model can be determined by the relation between the training $\beta_{eff}$ and the validation accuracy I. Since both $\beta_{eff}$ and I are available during fine-tuning, a set of data points of these two in the early phase are collected as the observations, and a regularized linear model $I=h(\beta_{eff}; \theta)$ is fitted with Bayesian ridge regression, where $\theta$ are the associated coefficients. The estimated predictor $I=h(\beta_{eff}; \theta^*)$ makes prediction of the final accuracy of models by setting $\beta_{eff}=0$, i.e., $I^*=h(0; \theta^*)$, see an example in the third row of FIG. 2. For full training of the best model, one can either retain or remove the NCP 138 and fine-tune the selected model.

Computing Structure

Figures 4, 5:
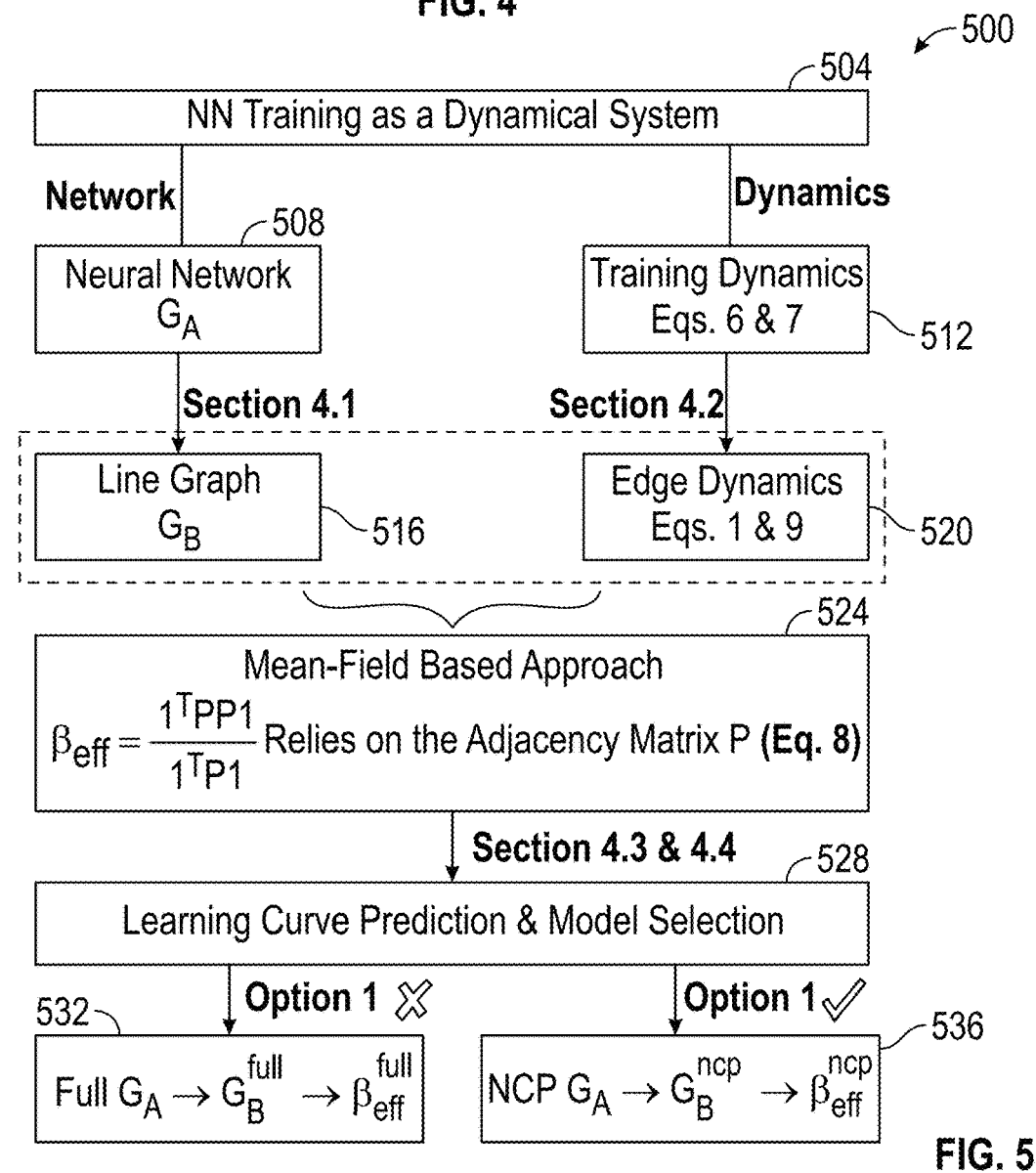
FIG. 4 is a table showing a comparison between the disclosed $\beta_{eff}$ based approach and the baselines in model ranking, in accordance with an example embodiment.
FIG. 5 is a high-level flowchart of an example workflow for creating a machine learning system, in accordance with an example embodiment.

FIG. 5 is a high-level flowchart of an example workflow 500 for creating a machine learning system, in accordance with an example embodiment. Example embodiments are run on a framework built using several different techniques. The NN training 504 is viewed as a dynamical system, and the evolving of the trainable weights in the SGD based on training is directly modeled as a set of differential equations (see sections entitled "Dynamical system of a network" and "NN training is a dynamical system"), characterized by the general dynamics in Eq. (1). Usually, it is convenient to study the dynamics of agents (trainable weights in an example embodiment) on a regular network, where each node represents an agent in the dynamical system and the interactions of agents are governed by Eq. (1). Many powerful techniques have been developed in network science and dynamical systems, such as the universal metric $\beta_{eff}$ to quantify and categorize various types of networks, including biological neural networks. Because of the generality of the metric, how the metric looks on artificial neural networks which are designed to mimic the biological counterpart for general intelligence is analyzed. Therefore, an analogue system of the trainable weights under the context of the general dynamics is set up in one example framework. To this end, a line graph 516 is built for the trainable weights (see FIG. 1A, the section entitled "Line Graph $G_B$" and the section entitled "Edge Dynamics $\mathcal{B}$") and the training dynamics 512 is "rewritten" in the form of Eq. (1), which includes a self-driving force $f(\cdot)$, an external driving force $g(\cdot,\cdot)$ and an adjacency matrix P (see Eqs. (8) & (9); edge dynamics 520 and mean-field based approach 524).

The reformulated training dynamics yields a simple yet powerful property. It is proved that as the neural network converges, $\beta_{eff}$ approaches zero (see Theorem 4.1 and the section entitled "Neural Capacitance"). As shown in FIG. 1C and the section entitled "Neural Capacitance", the property is exploited to predict the final accuracy of a neural network model with a few observations during the early phase of the training, and it is applied to select the pre-trained models (see Algorithm 1 and the section entitled "Model Selection with $\beta_{eff}$"; learning curve prediction and model selection 528). Generally speaking, the metric $\beta_{eff}$ should be calculated for the entire neural network (Option 1 532). However, many state-of-the-art neural network models have large-scale trainable weights. If all layers are considered, it will be prohibitive to compute the associated $\beta_{eff}$. A compromise is made, and $\beta_{eff}$ of the entire network is estimated using $\beta_{eff}$ of the NCP unit 138 (i.e., a partial part of the entire network, see the second to the last sentence of the section entitled the "Neural Capacitance"; Option 2 536). It is confirmed from empirical experiments (see the section entitled "Experiments and results") that the simplified, lightweight version of eff is still effective in predicting the final accuracy of the entire network.

The metric $\beta_{eff}$ is universal for characterizing different types of networks. Although one example framework utilizes the metric, the application to artificial neural network training dynamics and the related theoretical results, as specified by Theorem 4.1, are novel. Specifically, it is applied to study the NN training 504 (see sections entitled "Dynamical system of a network" and "NN training is a dynamical system") and to predict the final accuracy of a neural network with a few observations during the early phase of the training (FIG. 1C), but #eff relies on the adjacency matrix P of $G_A$ (Eq. (3)). To derive the adjacency matrix P, a reformulation (see the section entitled "Edge Dynamics B") of the training dynamics 512 is resorted to in the same form of the general dynamics (Eq. (1)). One issue in calculating $\beta_{eff}$ is the complexity if the entire neural network $G_A$ 508 is considered. As a resolution, the lightweight $\beta_{eff}$ of the NCP unit 138—a partial component of $G_A$—is used to predict the performance of the entire network (see the section entitled "Neural Capacitance" and the section entitled "Model Selection with $\beta_{eff}$").

In FIG. 5, the blocks corresponding to the indicated equations can be implemented by high-level code to solve the equations that is compiled or interpreted intro computer-executable code. Suitable decision blocks can be employed as needed.

Experiments and Results

Figure 2:
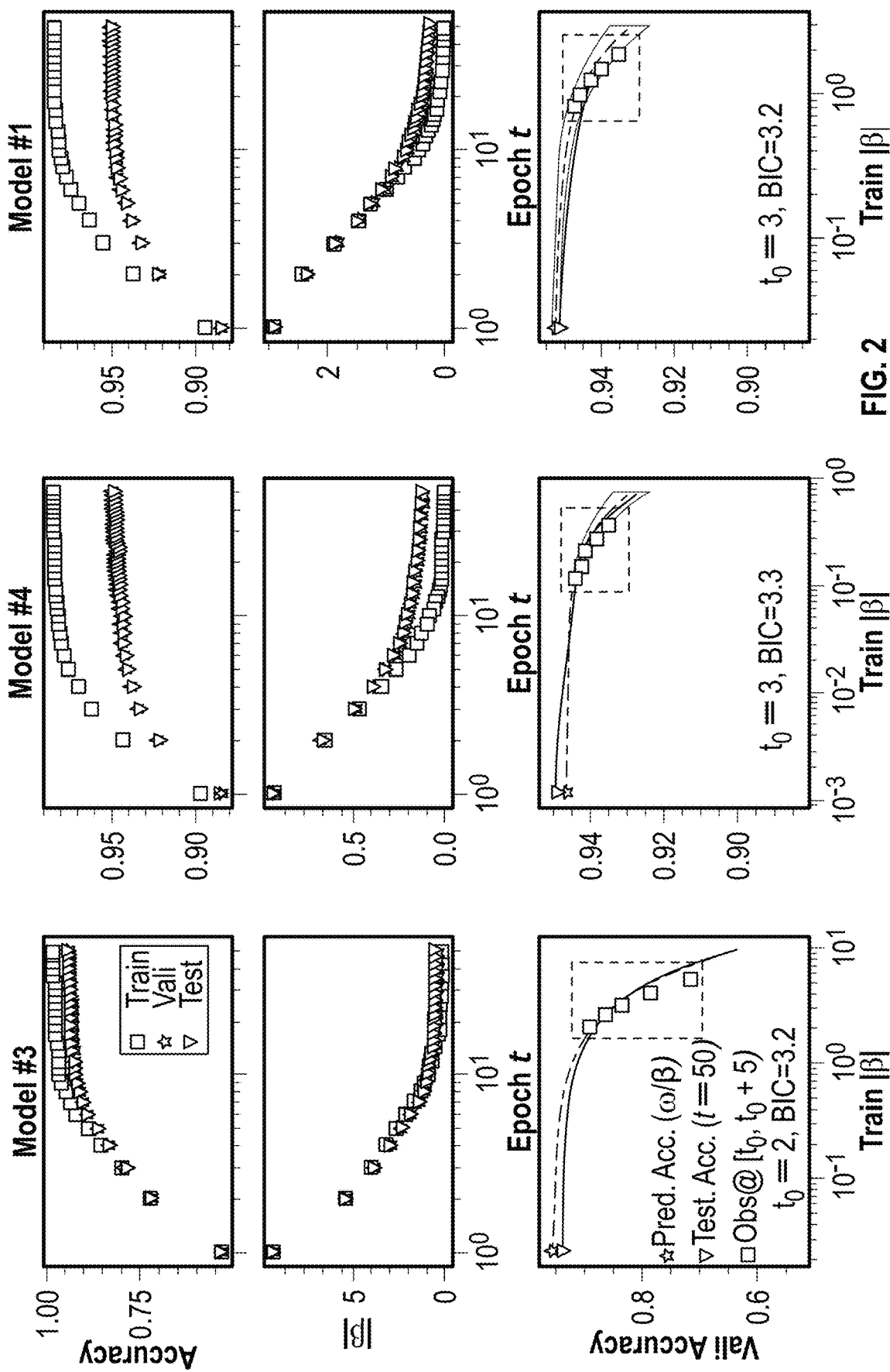
FIG. 2 shows learning curves of five representative pre-trained models with respect to (w.r.t.) accuracy (first row of graphs) and $\beta_{eff}$ (second row of graphs), in accordance with an example embodiment.

FIG. 2 shows learning curves of five representative pre-trained models w.r.t. accuracy (the first row of graphs) and $\beta_{eff}$ (the second row of graphs), in accordance with an example embodiment. A regularized linear model $h(\cdot; \theta)$ (dashed curve in the third row of graphs) is estimated with Bayesian ridge regression using a few of observations of $\beta_{eff}$ on training set and validation accuracy I during early fine-tuning. The starting epoch $t_0$ of observations affects the fit of h, and is automatically determined according to Bayesian information criterion (BIC), and the true test accuracy at epoch 50 is predicted with $I^*=h(0; \theta^*)$.

Figure 3A:
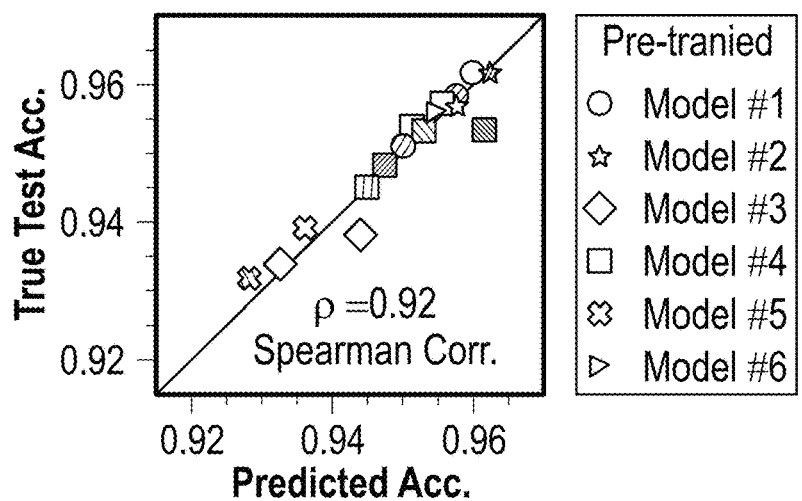
FIG. 3A illustrates the disclosed $\beta_{eff}$ based prediction of the validation accuracy versus the true test accuracy at epoch 50 of seven representative pre-trained models, in accordance with an example embodiment.
Figure 3B:
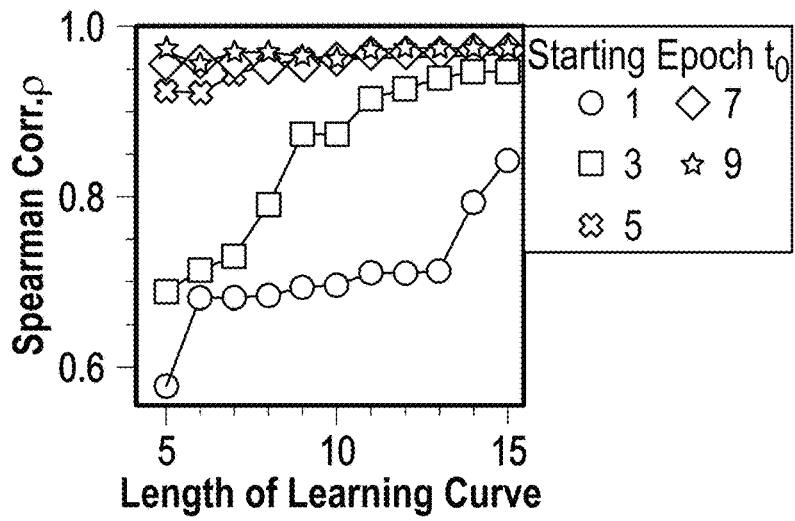
FIG. 3B illustrates the impacts of the starting epoch to of the observations, in accordance with an example embodiment.
Figure 3C:
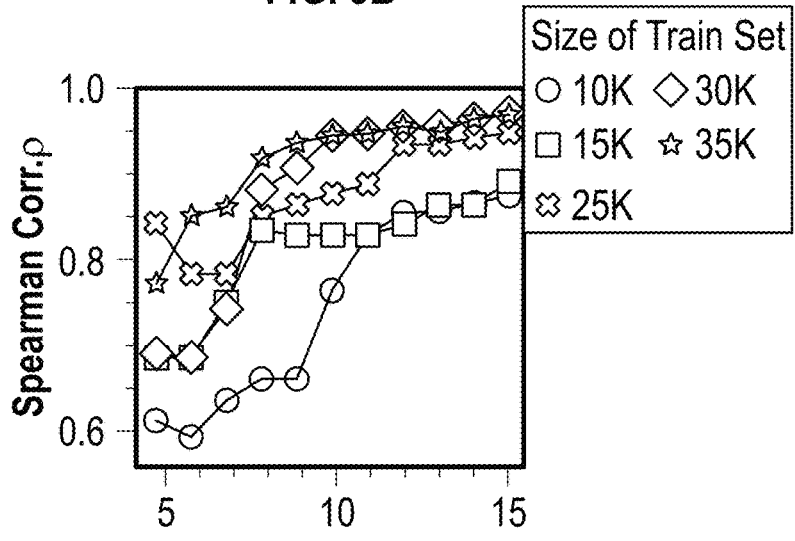
FIG. 3C illustrates the number of training samples on the ranking performance of the disclosed $\beta_{eff}$ based approach, in accordance with an example embodiment.

FIG. 3A illustrates the $\beta_{eff}$ based prediction of the validation accuracy versus the true test accuracy at epoch 50 of seven representative pre-trained models, in accordance with an example embodiment. Each shape is associated with one type of pre-trained model. Distinct models of the same type are marked in different shapes. The accuracy of one particular conventional neural network was much lower than others, and it is excluded for better visualization. Its predicted accuracy is 0.871, and the true test accuracy is 0.868. If it is included, $\rho=0.93>0.92$. FIG. 3B illustrates the impacts of the starting epoch $t_0$ of the observations, in accordance with an example embodiment. FIG. 3C illustrates the number of training samples on the ranking performance of the disclosed $\beta_{eff}$ based approach, in accordance with an example embodiment.

Pre-Trained Models and Datasets

Seventeen conventional pre-trained image models implemented using a software library that includes a Python© (registered trademark of PYTHON SOFTWARE FOUNDATION BEAVERTON OREGON USA) interface for artificial neural networks, were evaluated to measure the performance of one or more exemplary embodiments. Four benchmark datasets and one challenge dataset were used, and their original train/test splits were adopted. In addition, 15K original training samples were set aside as validation set for each dataset. It is noted that a variety of training datasets were utilized, including datasets of labeled images where the labels identified objects detected in the image, such as images labeled with types of wildlife, images labeled with types of cars or airplanes, labeled handwritten digits, and the like.

Experimental Setup

To obtain a well-defined $\beta_{eff}$, $G_A$ requires at least three hidden layers in one or more embodiments. Also, a batch normalization is usually beneficial because it can stabilize the training by adjusting the magnitude of activations and gradients. To this end, an NCP unit 138 is put on top of each pre-trained model; the NCP unit 138 includes (1) a dense layer of size 256, (2) a dense layer of size 128, each of which follows (3) a batch normalization and is followed by (4) a dropout layer with a dropout probability of 0.4. Before fine-tuning, the NCP unit 138 is initialized using Kaiming Normal initialization (a known initialization method for neural networks that takes into account the non-linearity of activation functions, such as ReLU activations).

A batch size of 64 and a learning rate of 0.001 are set, and each pre-trained model is fine-tuned for T=50 epochs. In order to control the randomness, the experiments are repeated for 20 runs for each model and an analysis is performed over the average result. As shown in FIG. 2, the pre-trained models converged after the fine-tuning on a conventional dataset #1. For each model, the validation accuracy (stars in the first row of graphs) and $\beta_{eff}$ on the training set (squares in the second row of graphs) are collected during the early stage of the fine-tuning as the observations (e.g., squares in the third row of graphs marked by the box for 5 epochs), then these observations are used to predict the test accuracy unseen before the fine-tuning terminates. For better illustration, learning curves are visualized on a log-scale.

Evaluation

The Bayesian ridge regression is applied on the observations to capture the relation between $\beta_{eff}$ and the validation accuracy, and to estimate a learning curve predictor $I=h(\beta_{eff}; \theta^*)$. The performance of the model is revealed as $I^*=h(\beta_{eff}^*; \theta^*)$ with $\beta_{eff}^*=0$. As shown in the third row of graphs of FIG. 2, the dashed lines are estimated $h(\cdot; \theta)$, the true test accuracy at T and the predicted accuracy are marked as triangles and stars, respectively. Both the estimates and predictions are accurate.

One advantageous capability of one or more embodiments is the ability to select the best model from a pool of candidates. In one or more instances, relative rank of these candidates matters more than their exact values of predicted accuracy. To evaluate and compare different approaches, the Spearman's rank correlation coefficient $\rho$ is chosen as the metric, and $\rho$ is calculated over the true test accuracy at epoch T and the predicted accuracy $I^*$ of all pre-trained models. In FIG. 3A, the true and predicted accuracy are reported for each model on the conventional dataset #1, as well as the overall ranking performance measured by $\rho$. It indicates that the disclosed ($\beta$-based model ranking is reliable with $\rho>0.9$.

The estimation quality of h determines how well the relation between I and $\beta_{eff}$ is captured. Besides the regression method, the starting epoch $t_0$ of the observations also plays a role in the estimation. As shown in FIG. 3B, the impact of $t_0$ on $\rho$ of the disclosed approach is evaluated. As can be seen, when the length of the learning curves is fixed, a higher $t_0$ usually produces a better p. Since an ultimate goal is to arrive at a prediction with the early observations, $t_0$ should also be constrained to a small value. To make the comparisons fair, $t_0$ is viewed as a hyper-parameter, and it is selected according to the Bayesian information criterion (BIC), as shown in the third row of graphs of FIG. 2.

Impact of Size of Training Set

The conventional dataset #1 has 50K original training and 10K testing samples. Generally, the 50K samples are further split into 35K for training and 15K for validation. In studying the dynamics of the NN training, it is essential to understand how varying the training size influences the effectiveness of the disclosed approach. The first {10,15,20, 25,30}K of the original 50K samples was selected as the training set of reduced size, and the last 10K samples as the validation set to fine-tune the pre-trained models for 50 epochs. As shown in FIG. 3C, a training set of size as small as 25K can be used to achieve similar performance to those that use all 35K training samples. It has an important implication for efficient NN training, because the size of the required training set can be greatly reduced (around 30% in the present experiment) while maintaining similar model ranking performance. It is to be noted that the true test accuracy used in computing $\rho$ is the same test accuracy for the model trained from 35K training samples and it is shared by all five cases {10,15,20,25,30}K in the exemplary analysis.

Results from Exemplary Embodiment(s) Versus Baselines

Support vector machine (SVM)-based LC predictors and a technique that treated the current learning curve as an affine transformation of previous learning curves (baselines #3 and #4 in FIGS. 4 and 6A) were selected as the baselines, as well as two heuristic rules of using the last seen value (LSV) or the best seen value (BSV) of a learning curve (baselines #2 and #1, respectively, in FIGS. 4 and 6A) for extrapolation.

FIG. 4 is a table showing a comparison between the disclosed ($\beta_{eff}$ based approach and the baselines in model ranking, in accordance with an example embodiment. The notation LLC represents the length of the learning curve, and "Imprv" represents the relative improvement of the disclosed approach in comparison to the best baseline.

The performance of an exemplary embodiment was compared with the baselines.

Figures 6A, 6B:
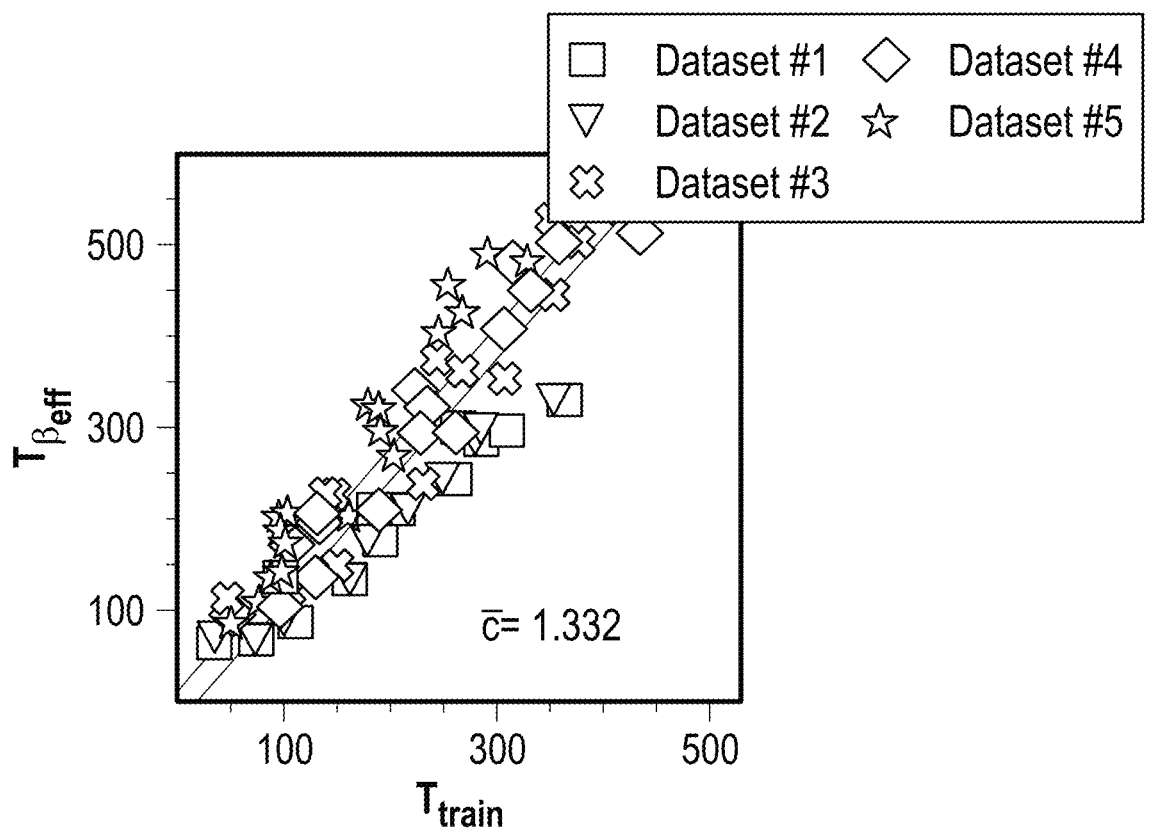
FIG. 6A is a table listing the running time (in seconds) in learning curve prediction, including the predictor estimation, in accordance with an example embodiment.
FIG. 6B is a graph illustrating the training time per epoch versus computing time for $\beta_{eff}$ per epoch over 17 pretrained models and five datasets, in accordance with an example embodiment.
Figure 6C:
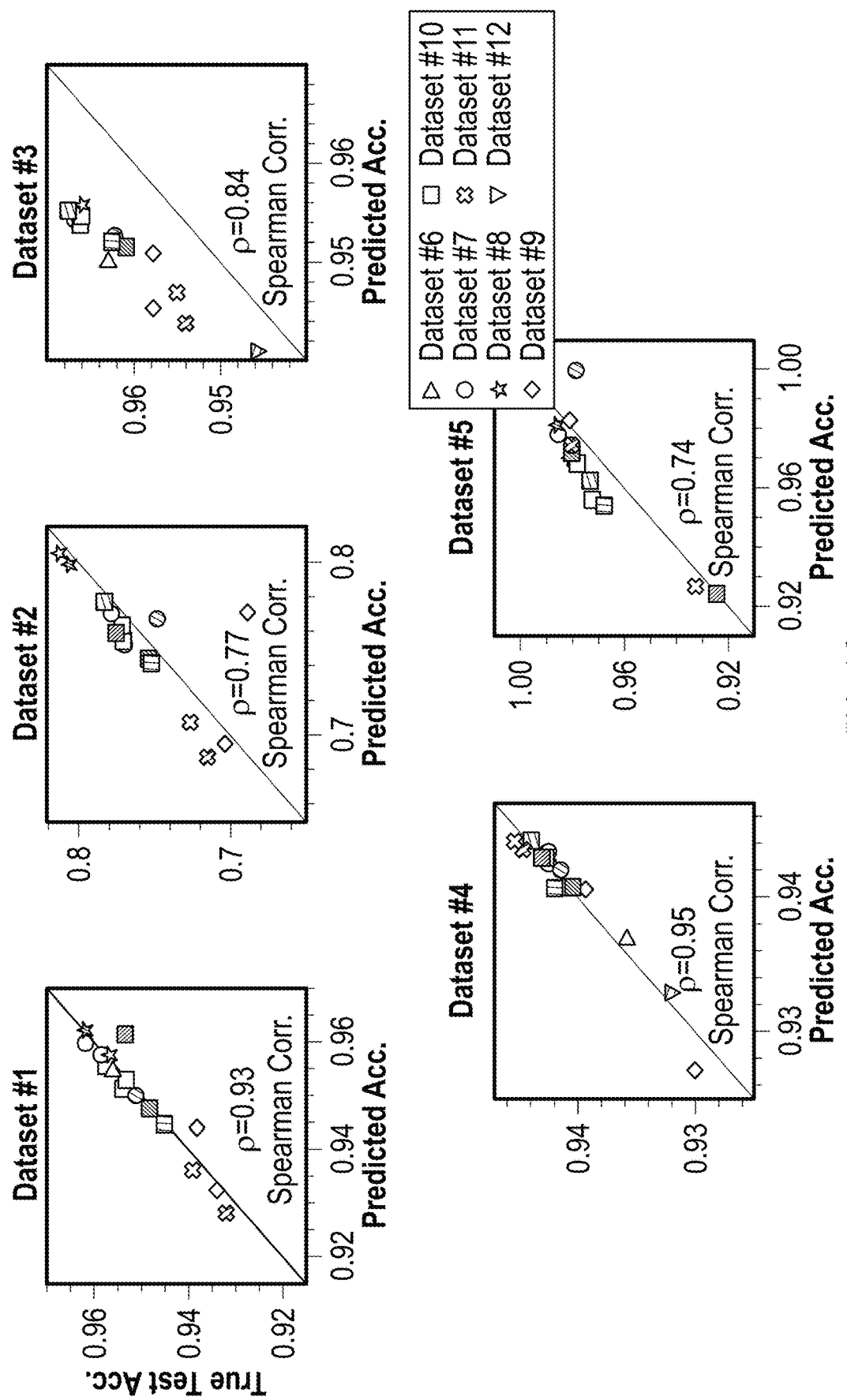
FIG. 6C shows graphs illustrating predictions of the validation accuracy of pre-trained models on five datasets based on $\beta_{eff}$ vs. true test accuracy of these models after fine-tuning for T=50 epochs, in accordance with an example embodiment.
Figure 6D:
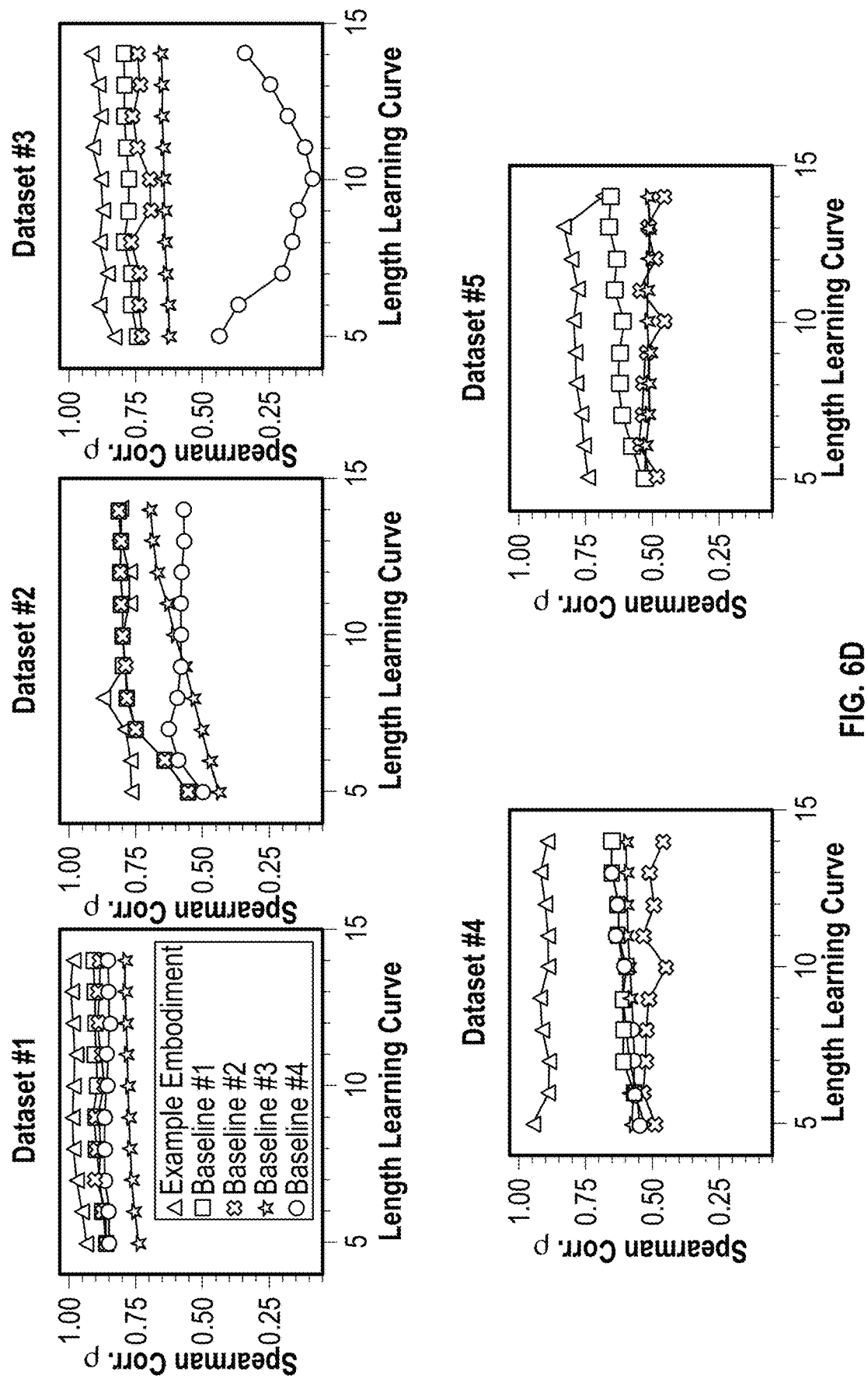
FIG. 6D shows graphs illustrating a performance comparison between a $\beta_{eff}$-based approach of an example embodiment and the baselines in ranking the pre-trained models with respect to their average accuracy over 20 runs, in accordance with an example embodiment.
Figure 6E:
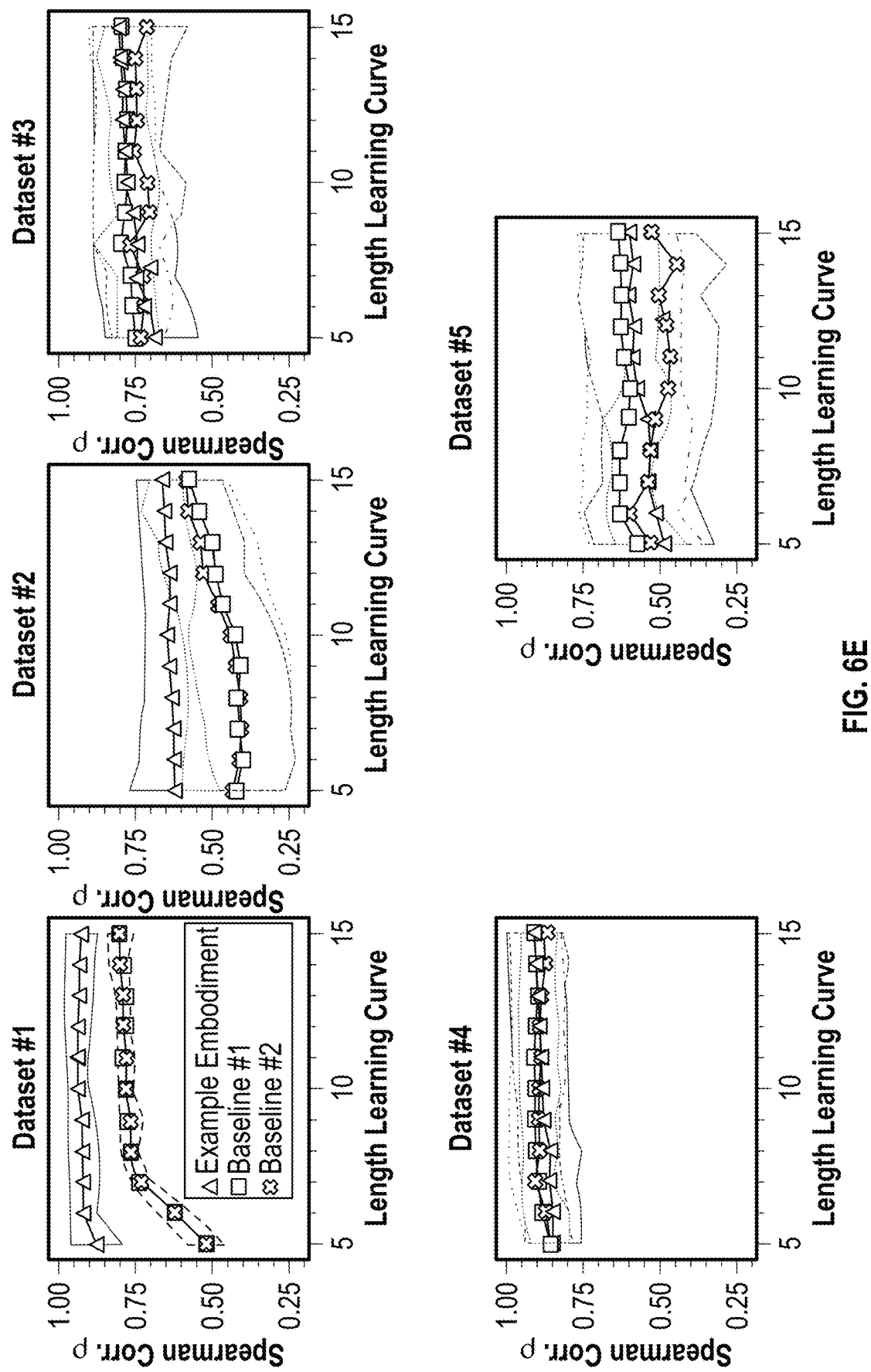
FIG. 6E shows graphs of a performance comparison between a $\beta_{eff}$ based approach of an example embodiment, and baselines #1 and #2 in ranking the pre-trained models with respect to their accuracy per run (mean and standard deviation of 20 runs), in accordance with an example embodiment.

FIG. 6D shows graphs illustrating a performance comparison between a $\beta_{eff}$-based approach of an example embodiment and the baselines in ranking the pre-trained models with respect to their average accuracy over 20 runs, in accordance with an example embodiment. As shown in the table of FIG. 4 and FIG. 6D, using just a few observations, e.g., only five epochs, an exemplary embodiment can achieve 9.1/38.3/12.4/65.3/40.1% relative improvements over the best baseline on conventional dataset #1, conventional dataset #2, conventional dataset #3, conventional dataset #4, and conventional dataset #5. Moreover, since each pre-trained model produces one learning curve per run, the ranking performance of the disclosed approach and the baselines was reported based on learning curves collected in individual runs. FIG. 6E shows graphs of a performance comparison between a $\beta_{eff}$ based approach of an example embodiment, and baselines #1 and #2 in ranking the pre-trained models with respect to their accuracy per run (mean and standard deviation of 20 runs), in accordance with an example embodiment. Baselines #3 and #4 rely on some extra learning curves, which are impractically available in the scenario of ranking only 17 pre-trained models per run, so the related data is omitted. As observed in FIG. 6E, an exemplary embodiment can achieve better ranking performance on the conventional dataset #2 and the conventional dataset #5, both of which are challenging tasks including 100 classes. On other datasets, the disclosed method attains comparable performance.

Running Time Analysis

FIG. 6B is a graph illustrating the training time per epoch versus computing time for f $\beta_{eff}$ per epoch over 17 pretrained models and five datasets, in accordance with an example embodiment. Each data point is associated with one pre-trained model over one dataset. The relative cost of one example embodiment in computing $\beta_{eff}$ with respect to training more epochs can be measured by $c=T_{\beta_{eff}}/T_{train}$. On average, it is $\bar{c} \approx 1.3$ (slope of the line).

FIG. 6C shows graphs illustrating predictions of the validation accuracy of pre-trained models on five datasets based on f $\beta_{eff}$ vs. true test accuracy of these models after fine-tuning for T=50 epochs, in accordance with an example embodiment. The Spearman's ranking correlation $\rho$ is used to quantify the performance in model selection. Each shape is associated with one type of pre-trained model. Distinct models of the same type are marked with different shapes. To be noted, each includes known convolutional neural network (CNN) architecture that can utilize graphics processing units (GPUs) in computing $\rho$s.

The disclosed approach is efficient, especially for large and deep NNs. Different from the training task that involves a full FP and BP, i.e. $T_{train}=T_{FP}+T_{BP}$, computing $\beta_{eff}$ only requires computing the adjacency matrix P according to Eq. (8) on the NCP unit 138, $T_{\beta_{eff}}=T_{NCP}$. Although the computation is complicated, the NCP 138 is lightweight. The computing cost per epoch is comparable to the training time per epoch (see FIG. 6B). Let $T_{\beta_{eff}}=c \times T_{train}$. If c>1, $T_{\beta_{eff}}$ is higher than $T_{train}$; if c<1, $T_{\beta_{eff}}$ is lower than $T_{train}$. Considering the required epochs, the disclosed approach employs k observations, and takes $T_{embodiment}=k \times T_{\beta_{eff}}$. To obtain the ground-truth final accuracy by running K epochs, it takes $T_{full}=K \times T_{train}$. If $T_{full}>T_{embodiment}$, the disclosed $\beta_{eff}$ based prediction is cheaper than "just training longer." It indicates that $K \times T_{train} - k \times T_{\beta_{eff}}$ (K−c×k)×$T_{train}$>0, saving us K−c×k more training epochs. Any desired time units (e.g., seconds) can be employed.

A running time analysis of the two tasks was performed with four conventional graphical processing units, and the related times are visualized in FIG. 6B. On average $c=T_{\beta_{eff}}/T_{train} \approx 1.3$, computing $\beta_{eff}$ takes 1.3 times of the training per epoch. However the efforts are paying off, as the final accuracy can be predicted by observing only k=10 of K=100 full training epochs, $T_{embodiment}$ is only 13% of $T_{full}$.

When the observations are used for learning curve prediction, the heuristics LSV and BSV directly take one observation (last or best) as the predicted value, so they are mostly computationally cheap but have suboptimal model ranking performances. Relatively, baselines #3 and #4 are more time-consuming because both require training a predictor with a set of full learning curves from other models. The disclosed approach also estimates a predictor, but does not need any external learning curves. Here, it is assumed that each model is observed for only k=5 epochs, and a running time analysis of these approaches is conducted over learning curve prediction, including estimating a predictor. FIG. 6A is a table listing the running time (in seconds) in learning curve prediction, including the predictor estimation (if necessary, e.g., an example embodiment, baseline #3, and baseline #4), in accordance with an example embodiment. As shown in the table of FIG. 6A, the disclosed approach applies Bayesian ridge regression to efficiently estimate the predictor $I=h(\beta_{eff}; 0)$, taking comparable time as baseline #3, significantly less than baseline #4, but performs best in model ranking. In contrast, the most expensive baseline #4, does not perform well, sometimes even worst.

Recapitulation

A new perspective of NN model selection is presented by directly exploring the dynamical evolution of synaptic connections during NN training. The disclosed framework reformulates the SGD based NN training dynamics as edge dynamics B to capture the mutual interaction and dependency of synaptic connections. Accordingly, a networked system is built by converting an NN $G_A$ to a line graph $G_B$ with the governing dynamics $\mathcal{B}$, which induces a definition of the link weights in $G_B$. Moreover, a topological property of $G_B$, named neural capacitance $\beta_{eff}$, is developed and shown to be an effective metric in predicting the ranking of a set of pre-trained models based on early training results.

Given the discussion thus far, it will be appreciated that, in general terms, an exemplary method, according to an aspect of the invention, includes the operations of removing, using at least one processor, an output layer $\mathcal{F}_s^{(2)}$ 136 from a pre-trained neural network model $\mathcal{F}_s = \{\mathcal{F}_s^{(1)}, \mathcal{F}_s^{(2)}\}$ 132; incorporating, using the at least one processor, a neural capacitance probe (NCP) unit $\mathcal{U}$ 138 with multiple layers 140, 142 (FIG. 1B) on top of one or more bottom layers $\mathcal{F}_s^{(1)}$ 146 of the pre-trained neural network model $\mathcal{F}_s$ 132; randomly initializing, using the at least one processor, the neural capacitance probe (NCP) unit $\mathcal{U}$ 138; training, using the at least one processor, a modified neural network model $\mathcal{F}_t = \{\mathcal{F}_s^{(1)}, \mathcal{U}\}$ 154 by fine-tuning the one or more bottom layers $\mathcal{F}_s^{(1)}$ 146 on a target dataset $D_t$ 150 for a maximum number T of epochs, the modified neural network model $\mathcal{F}_t$ 154 comprising the neural capacitance probe (NCP) unit $\mathcal{U}$ 138 incorporated with multiple layers 140, 142 (FIG. 1B) on top of the one or more bottom layers $\mathcal{F}_s^{(1)}$ 146 of the pre-trained neural network model $\mathcal{F}_s$ 130; obtaining, using the at least one processor, an adjacency matrix P from the initialized neural capacitance probe (NCP) unit $\mathcal{U}$ 138; computing, using the at least one processor, a neural capacitance metric $\beta_{\mathit{eff}}$ using the adjacency matrix P; selecting, using the at least one processor, an active model using the neural capacitance metric $\beta_{\mathit{eff}}$; and configuring, using the at least one processor, a machine learning system using the active model.

It is noted that the selection of the active model using the neural capacitance metric $\beta_{\mathit{eff}}$, as computed above, reduces the consumption of computing resources in comparison to conventional neural network selection techniques.

It is noted that the bottom layers 146 are distinguished from the output layer 136 and the output layer 140, as shown in FIG. 1B.

In one example embodiment, data is classified using the configured machine learning system. In one example embodiment, the classification comprises at least one of image classification, identification of an object in an image, and text classification. In one example embodiment, the obtaining of the adjacency matrix P from the neural capacitance probe (NCP) unit $\mathcal{U}$ 138 is performed according to:

$$P^{(\ell,\ell+1)} = \frac{\partial^2 C}{\partial W^{(\ell)} \partial W^{(\ell+1)}},$$

wherein $\ell$ is an index for a layer (i.e., a neural network layer), $C$ is an objective function, and W is a weight.

In one example embodiment, the computing of the neural capacitance metric $\beta_{\mathit{eff}}$ with the adjacency matrix P is performed according to:

$$\beta_{\mathit{eff}} = \frac{1^T P \delta_{in}}{1^T \delta_{in}} = \frac{\delta_{out}^T \delta_{in}}{1^T \delta_{in}},$$

wherein $\delta_{in}$ and $\delta_{out}$ are activation gradients.

In one example embodiment, the computing of the neural capacitance metric $\beta_{\mathit{eff}}$ includes capturing a performance of a corresponding pre-trained model on a target task based on training results obtained prior to convergence of a loss function. In some cases, "early" training results are used; i.e. after a few epochs of training, prior to convergence, with only partial learning curves. Furthermore in this regard, normally, a neural network is trained until convergence (i.e., no change in loss function after a certain number of epochs).

In one example embodiment, a network mapping $\phi$ that represents a conversion of a neural network $G_A$ corresponding to the pre-trained neural network model to a directed line graph $G_B$ that is defined on edges in the neural network $G_A$ is constructed and the obtaining the adjacency matrix P is based on the directed line graph $G_B$.

In one aspect, a non-transitory computer readable medium comprises computer executable instructions which when executed by a computer cause the computer to perform the method of removing, using at least one processor, an output layer $\mathcal{F}_s^{(2)}$ 136 from a pre-trained neural network model $\mathcal{F}_s = \{\mathcal{F}_s^{(1)}, \mathcal{F}_s^{(2)}\}$ 132; incorporating, using the at least one processor, a neural capacitance probe (NCP) unit $\mathcal{U}$ 138 with multiple layers 140, 142 (FIG. 1B) on top of one or more bottom layers $\mathcal{F}_s^{(1)}$ 146 of the pre-trained neural network model $\mathcal{F}_s$ 132; randomly initializing, using the at least one processor, the neural capacitance probe (NCP) unit $\mathcal{U}$ 138; training using the at least one processor, a modified neural network model $\mathcal{F}_t = \{\mathcal{F}_s^{(1)}, \mathcal{U}\}$ 154 by fine-tuning the one or more bottom layers $\mathcal{F}_s^{(1)}$ 146 on a target dataset $D_t$ 150 for a maximum number T of epochs, the modified neural network model $\mathcal{F}_t$ 154 comprising the neural capacitance probe (NCP) unit $\mathcal{U}$ 138 incorporated with multiple layers 140, 142 (FIG. 1B) on top of the one or more bottom layers $\mathcal{F}_s^{(1)}$ 146 of the pre-trained neural network model $\mathcal{F}_s$ 130; obtaining, using the at least one processor, an adjacency matrix P from the initialized neural capacitance probe (NCP) unit $\mathcal{U}$ 138; computing, using the at least one processor, a neural capacitance metric $\beta_{\mathit{eff}}$ using the adjacency matrix P; selecting, using the at least one processor, an active model using the neural capacitance metric $\beta_{\mathit{eff}}$; and configuring, using the at least one processor, a machine learning system using the active model.

In one aspect, an apparatus comprises a memory and at least one processor, coupled to the memory, and operative to perform operations comprising removing, using at least one processor, an output layer $\mathcal{F}_s^{(2)}$ 136 from a pre-trained neural network model $\mathcal{F}_s = \{\mathcal{F}_s^{(1)}, \mathcal{F}_s^{(2)}\}$ 132; incorporating, using the at least one processor, a neural capacitance probe (NCP) unit $\mathcal{U}$ 138 with multiple layers 140, 142 (FIG. 1B) on top of one or more bottom layers $\mathcal{F}_s^{(1)}$ 146 of the pre-trained neural network model $\mathcal{F}_s$ 132; randomly initializing, using the at least one processor, the neural capacitance probe (NCP) unit $\mathcal{U}$ 138; training, using the at least one processor, a modified neural network model $\mathcal{F}_t = \{\mathcal{F}_s^{(1)}, \mathcal{U}\}$ 154 by fine-tuning the one or more bottom layers $\mathcal{F}_s^{(1)}$ 146 on a target dataset $D_t$ 150 for a maximum number T of epochs, the modified neural network model $\mathcal{F}_t$ 154 comprising the neural capacitance probe (NCP) unit $\mathcal{U}$ 138 incorporated with multiple layers 140, 142 (FIG. 1B) on top of the one or more bottom layers $\mathcal{F}_s^{(1)}$ 146 of the pre-trained neural network model $\mathcal{F}_s$ 130; obtaining, using the at least one processor, an adjacency matrix P from the initialized neural capacitance probe (NCP) unit $\mathcal{U}$ 138; computing, using the at least one processor, a neural capacitance metric $\beta_{\mathit{eff}}$ using the adjacency matrix P; selecting, using the at least one processor, an active model using the neural capacitance metric $\beta_{\mathit{eff}}$; and configuring, using the at least one processor, a machine learning system using the active model.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
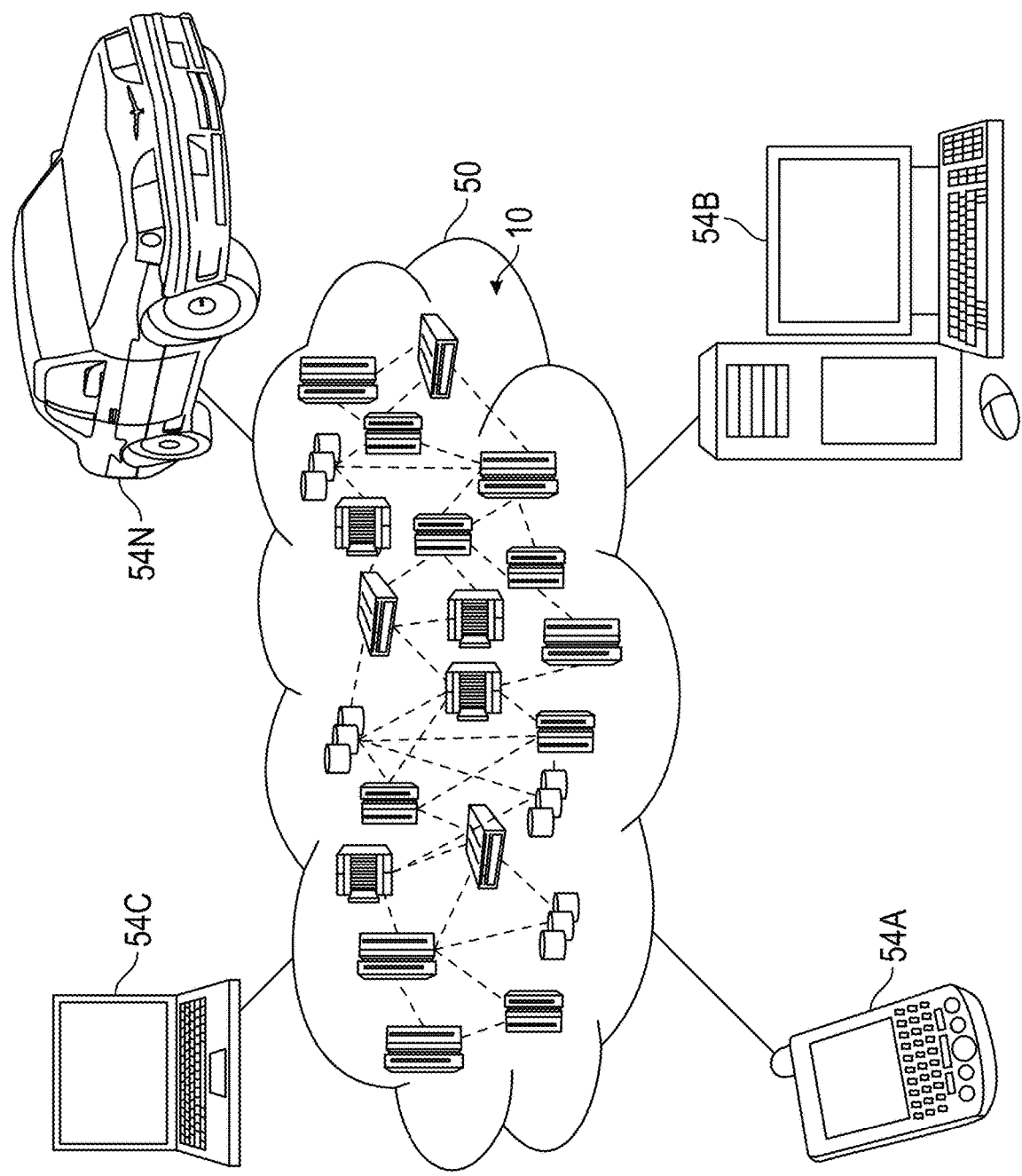
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
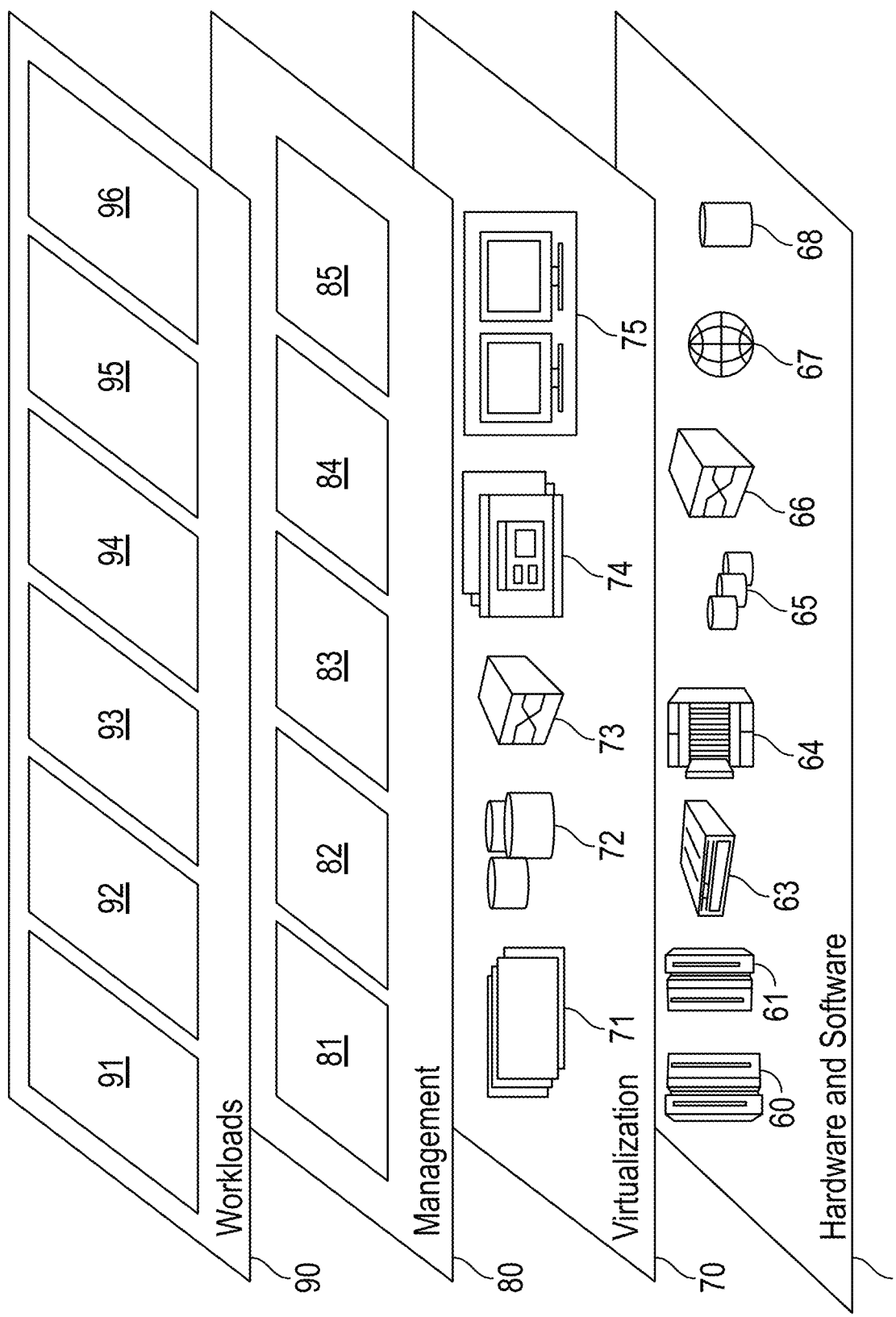
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and at least a portion of a system for dynamic video inference processing 96.

Figure 9:
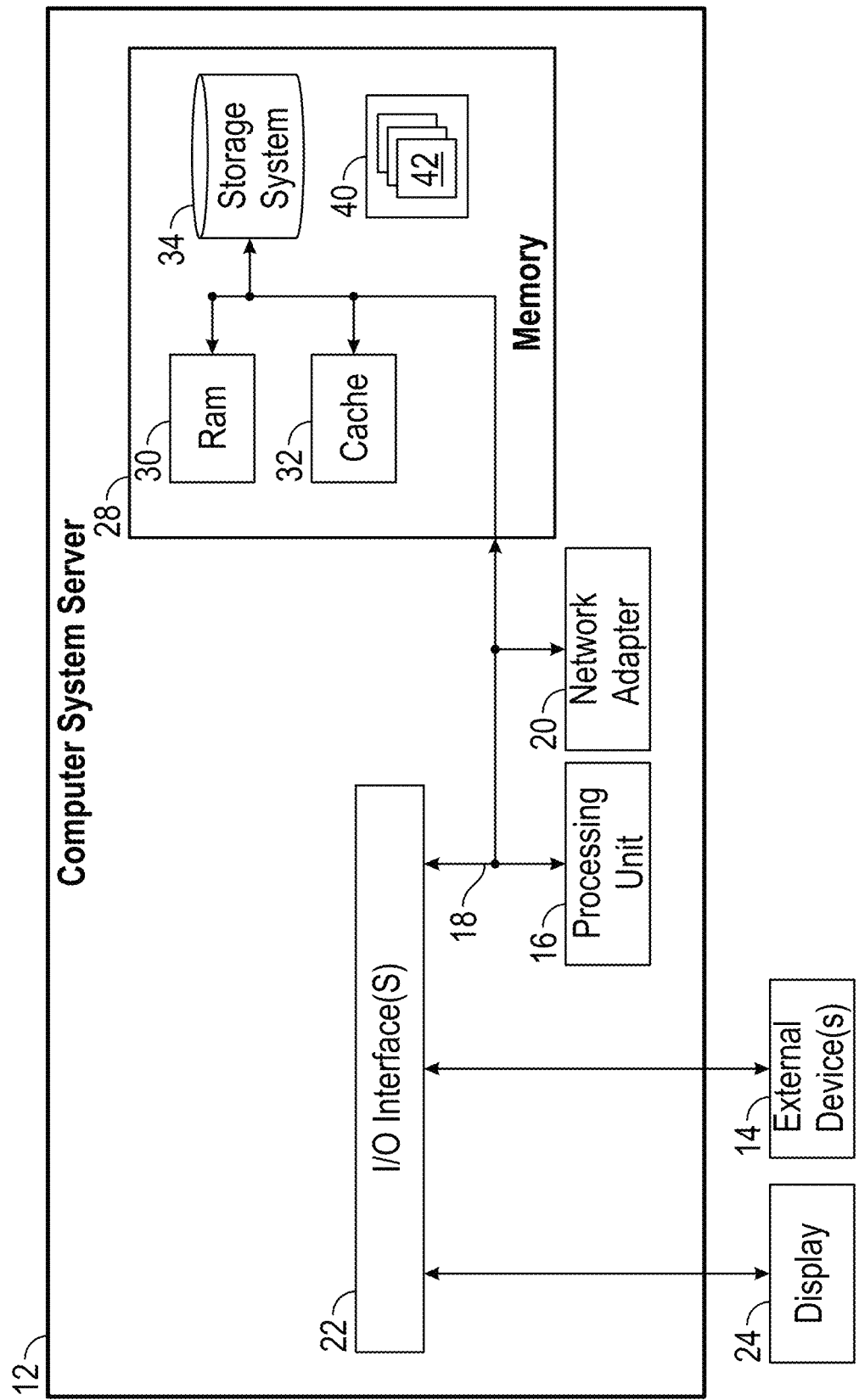
FIG. 9 depicts a computer system that may be useful in implementing one or more aspects and/or elements of the invention, also representative of a cloud computing node according to an embodiment of the present invention.

One or more embodiments of the invention, or elements thereof, can be implemented in the form of an apparatus including a memory and at least one processor that is coupled to the memory and operative to perform exemplary method steps. FIG. 9 depicts a computer system that may be useful in implementing one or more aspects and/or elements of the invention, also representative of a cloud computing node according to an embodiment of the present invention. Referring now to FIG. 9, cloud computing node 10 is only one example of a suitable cloud computing node and is not intended to suggest any limitation as to the scope of use or functionality of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 9, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 9) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 6-7 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   removing, using at least one processor, an output layer from a pre-trained neural network model;
   incorporating, using the at least one processor, a neural capacitance probe (NCP) unit with multiple layers on top of one or more bottom layers of the pre-trained neural network model;
   randomly initializing, using the at least one processor, the neural capacitance probe (NCP) unit;
   training, using the at least one processor, a modified neural network model by fine-tuning the one or more bottom layers on a target dataset for a maximum number of epochs, the modified neural network model comprising the neural capacitance probe (NCP) unit incorporated with multiple layers on top of the one or more bottom layers of the pre-trained neural network model;
   obtaining, using the at least one processor, an adjacency matrix from the initialized neural capacitance probe (NCP) unit;
   computing, using the at least one processor, a neural capacitance metric using the adjacency matrix;
   selecting, using the at least one processor, an active model using the neural capacitance metric; and
   configuring, using the at least one processor, a machine learning system using the active model.

2. The method of claim 1, further comprising classifying data using the configured machine learning system.

3. The method of claim 1, wherein the classification comprises at least one of image classification, identification of an object in an image, and text classification.

4. The method of claim 1, wherein the adjacency matrix is designated as P and wherein the obtaining of the adjacency matrix P from the neural capacitance probe (NCP) unit is performed according to:

$$P^{(\ell,\ell+1)} = \frac{\partial^2 C}{\partial W^{(\ell)} \partial W^{(\ell+1)}},$$

wherein $\ell$ is an index for a layer, $C$ is an objective function, and W is a weight.

5. The method of claim 1, wherein the adjacency matrix is designated as P, the neural capacitance metric is designated as $\beta_{eff}$, and the computing of the neural capacitance metric $\beta_{eff}$ with the adjacency matrix P is performed according to:

$$\beta_{eff} = \frac{1^T P \delta_{in}}{1^T \delta_{in}} = \frac{\delta_{out}^T \delta_{in}}{1^T \delta_{in}},$$

wherein $\delta_{in}$ and $\delta_{out}$ are activation gradients.

6. The method of claim 1, wherein the neural capacitance metric is designated as $\beta_{eff}$, and the computing of the neural capacitance metric $\beta_{eff}$ includes capturing a performance of a corresponding pre-trained model on a target task based on training results obtained prior to convergence of a loss function.

7. The method of claim 1, wherein the adjacency matrix is designated as P, further comprising constructing a network mapping $\phi$ that represents a conversion of a neural network $G_A$ corresponding to the pre-trained neural network model to a directed line graph $G_B$ that is defined on edges in the neural network $G_A$, wherein the obtaining of the adjacency matrix P is based on the directed line graph $G_B$.

8. A non-transitory computer readable medium comprising computer executable instructions which when executed by a computer cause the computer to perform the method of:
removing an output layer from a pre-trained neural network model;
incorporating a neural capacitance probe (NCP) unit with multiple layers on top of one or more bottom layers of the pre-trained neural network model;
randomly initializing the neural capacitance probe (NCP) unit;
training a modified neural network model by fine-tuning the one or more bottom layers on a target dataset for a maximum number of epochs, the modified neural network model comprising the neural capacitance probe (NCP) unit incorporated with multiple layers on top of the one or more bottom layers of the pre-trained neural network model;
obtaining an adjacency matrix from the initialized neural capacitance probe (NCP) unit;
computing a neural capacitance metric using the adjacency matrix;
selecting an active model using the neural capacitance metric; and
configuring a machine learning system using the active model.

9. The non-transitory computer readable medium of claim 8, the method further comprising classifying data using the configured machine learning system.

10. The non-transitory computer readable medium of claim 8, wherein the classification comprises at least one of image classification, identification of an object in an image, and text classification.

11. The non-transitory computer readable medium of claim 8, wherein the adjacency matrix is designated as P and wherein the obtaining of the adjacency matrix P from the neural capacitance probe (NCP) unit is performed according to:

$$P^{(\ell,\ell+1)} = \frac{\partial^2 C}{\partial W^{(\ell)} \partial W^{(\ell+1)}},$$

wherein $\ell$ is an index for a layer, $C$ is an objective function, and W is a weight.

12. The non-transitory computer readable medium of claim 8, wherein the adjacency matrix is designated as P, the neural capacitance metric is designated as $\beta_{eff}$, and the computing of the neural capacitance metric $\beta_{eff}$ with the adjacency matrix P is performed according to:

$$\beta_{eff} = \frac{1^T P \delta_{in}}{1^T \delta_{in}} = \frac{\delta_{out}^T \delta_{in}}{1^T \delta_{in}},$$

wherein $\delta_{in}$ and $\delta_{out}^T$ are activation gradients.

13. The non-transitory computer readable medium of claim 8, wherein the neural capacitance metric is designated as $\beta_{eff}$, the computing of the neural capacitance metric $\beta_{eff}$ includes capturing a performance of a corresponding pre-trained model on a target task based on training results obtained prior to convergence of a loss function.

14. An apparatus comprising:
a memory; and
at least one processor, coupled to said memory, and operative to perform operations comprising:
removing an output layer from a pre-trained neural network model;
incorporating a neural capacitance probe (NCP) unit with multiple layers on top of one or more bottom layers of the pre-trained neural network model;
randomly initializing the neural capacitance probe (NCP) unit;
training a modified neural network model by fine-tuning the one or more bottom layers on a target dataset for a maximum number of epochs, the modified neural network model comprising the neural capacitance probe (NCP) unit incorporated with multiple layers on top of the one or more bottom layers of the pre-trained neural network model;
obtaining an adjacency matrix from the initialized neural capacitance probe (NCP) unit;
computing a neural capacitance metric using the adjacency matrix;
selecting an active model using the neural capacitance metric; and
configuring a machine learning system using the active model.

15. The apparatus of claim 14, the operations further comprising classifying data using the configured machine learning system.

16. The apparatus of claim 14, wherein the classification comprises at least one of image classification, identification of an object in an image, and text classification.

17. The apparatus of claim 14, wherein the adjacency matrix is designated as P and wherein the obtaining of the adjacency matrix P from the neural capacitance probe (NCP) unit is performed according to:

$$P^{(\ell,\ell+1)} = \frac{\partial^2 C}{\partial W^{(\ell)} \partial W^{(\ell+1)}},$$

wherein $\ell$ is an index for a layer, $C$ is an objective function, and W is a weight.

18. The apparatus of claim 14, wherein the adjacency matrix is designated as P, the neural capacitance metric is designated as $\beta_{eff}$, and the computing of the neural capacitance metric $\beta_{eff}$ with the adjacency matrix P is performed according to:

$$\beta_{\mathit{eff}} = \frac{1^T P \delta_{in}}{1^T \delta_{in}} = \frac{\delta_{out}^T \delta_{in}}{1^T \delta_{in}},$$

wherein $\delta_{in}$ and $\delta_{out}^T$ are activation gradients.

19. The apparatus of claim 14, wherein the neural capacitance metric is designated as $\beta_{\mathit{eff}}$, and the computing of the neural capacitance metric $\beta_{\mathit{eff}}$ includes capturing a performance of a corresponding pre-trained model on a target task based on training results obtained prior to convergence of a loss function.

20. The apparatus of claim 14, wherein the adjacency matrix is designated as P, the operations further comprising constructing a network mapping $\phi$ that represents a conversion of a neural network $G_A$ corresponding to the pre-trained neural network model to a directed line graph $G_B$ that is defined on edges in the neural network $G_A$ and wherein the obtaining the adjacency matrix P is based on the directed line graph $G_B$.

* * * * *